US011101770B2

(12) United States Patent
Zhang et al.

(10) Patent No.: US 11,101,770 B2
(45) Date of Patent: Aug. 24, 2021

(54) PHOTOVOLTAIC POWER PLANT AND PRIMARY FREQUENCY MODULATION CONTROL METHOD THEREFOR

(71) Applicant: BEIJING GOLDWIND SCIENCE & CREATION WINDPOWER EQUIPMENT CO., LTD., Beijing (CN)

(72) Inventors: Yi Zhang, Beijing (CN); Yuan Qiao, Beijing (CN); Xianwen Bao, Beijing (CN)

(73) Assignee: BEIJING GOLD WIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/632,331

(22) PCT Filed: May 10, 2018

(86) PCT No.: PCT/CN2018/086348
§ 371 (c)(1),
(2) Date: Jan. 17, 2020

(87) PCT Pub. No.: WO2019/128036
PCT Pub. Date: Jul. 4, 2019

(65) Prior Publication Data
US 2020/0169219 A1    May 28, 2020

(30) Foreign Application Priority Data
Dec. 31, 2017  (CN) .................... 201711497106.7

(51) Int. Cl.
*H02J 3/24* (2006.01)
*H02S 50/00* (2014.01)
*H02S 40/32* (2014.01)

(52) U.S. Cl.
CPC .............. *H02S 50/00* (2013.01); *H02J 3/241* (2020.01); *H02S 40/32* (2014.12); *H02J 2300/24* (2020.01)

(58) Field of Classification Search
CPC .... H02J 3/38; H02J 3/381; H02J 3/383; H02J 3/46; H02J 3/48; H02J 3/241;
(Continued)

(56) References Cited

U.S. PATENT DOCUMENTS 6,609,361 B2      8/2003   Vugdelija
2014/0306533 A1*  10/2014  Paquin .................... H02J 3/381
                                                                   307/52
2017/0149373 A1    5/2017   Aghatehrani et al.

FOREIGN PATENT DOCUMENTS

CN    105449701 A    3/2016
CN    106300394 A    1/2017
(Continued)

OTHER PUBLICATIONS

International Search Report and Written Opinion in corresponding PCT Application No. PCT/CN2018/086348, dated Aug. 10, 2018, 11 pages.
(Continued)

*Primary Examiner* — Kyle J Moody
*Assistant Examiner* — Jye-June Lee
(74) *Attorney, Agent, or Firm* — Bayes PLLC

(57) ABSTRACT

Disclosed are a photovoltaic power plant and a primary frequency modulation control method therefor. The photovoltaic power plant comprises a photovoltaic power plant and an active power control system. The photovoltaic power plant comprises a photovoltaic array and a photovoltaic inverter, the photovoltaic inverter converting direct current electric energy generated by the photovoltaic array into alternating current electric energy. The active power control
(Continued)

system is used for determining the variable quantity of active power of a single machine according to an operating state of the photovoltaic inverter when frequency values of grid connection points of the photovoltaic power plant meet a pre-set primary frequency modulation triggering condition, and regulating the active power output by the photovoltaic inverter. According to the disclosed photovoltaic power, the response speed and accuracy of primary frequency modulation of a generator set can be improved.

19 Claims, 8 Drawing Sheets

(58) Field of Classification Search
CPC ... H02J 2300/24; H02J 2300/28; Y02E 10/56; H02S 50/00; H02S 40/32
See application file for complete search history.

(56) References Cited

FOREIGN PATENT DOCUMENTS

| | | | | |
|---|---|---|---|---|
| CN | 106571646 | A | * | 4/2017 |
| CN | 106571646 | A | | 4/2017 |
| CN | 108039740 | A | * | 5/2018 |
| EP | 2 790 287 | A2 | | 10/2014 |

OTHER PUBLICATIONS

Extended European Search Report issued in corresponding European Application No. 18727649.8, dated May 14, 2020, 10 pages.

* cited by examiner

PHOTOVOLTAIC POWER PLANT AND PRIMARY FREQUENCY MODULATION CONTROL METHOD THEREFOR

This application is the national phase of International Application No. PCT/CN2018/086348, titled PHOTOVOLTAIC POWER PLANT AND PRIMARY FREQUENCY MODULATION CONTROL METHOD THEREFOR, filed on May 10, 2018, which claims the benefit of priority to Chinese Patent Application No. 201711497106.7 titled PHOTOVOLTAIC POWER PLANT AND PRIMARY FREQUENCY MODULATION CONTROL METHOD THEREFOR, filed with the China National Intellectual Property Administration on Dec. 31, 2017, the entire disclosures thereof are incorporated herein by reference.

FIELD

The present application relates to the field of power control of the electric power system, in particular to a photovoltaic power plant and a primary frequency modulation control method for the photovoltaic power plant.

BACKGROUND

With the increasing permeability of new energy generator sets, the centralized access of large-scale new energy field stations brings new challenges to the safe, stable and efficient operation of electric power systems. In the actual operation of the power grid, in a case that the power consumption does not match with the power supply, small components with small changes and short changing periods of the power grid frequency may be caused. Generally, the fluctuation of the power grid frequency can be corrected by the own frequency of the adjustment system of the generator set. This process is called the primary frequency modulation of the generator set. The secondary frequency modulation refers to a frequency modulation method employed in a case that the load or the power generation output of the electric power system changes greatly and the frequency cannot be restored to a specified range by the primary frequency modulation.

The frequency modulation requirements of a conventional thermal power generating unit are as follows:
  in a case of the primary frequency modulation: a response delay time of the thermal power generating unit participating in the primary frequency modulation should be less than 3 seconds, and frequency fluctuation duration is less than 1 minute; and
  in a case of the secondary frequency modulation: the frequency fluctuation duration is a few minutes.

However, new energy generator sets usually employ a power electronic converter for grid connection. The converter for grid connection has a fast response speed and does not have the inertia and damping required for maintaining the safe and stable operation of the system. Therefore, there is a lack of an effective "synchronization" mechanism with a power distribution network. In a case that a large-scale new energy generator set is connected to the power grid, a total moment of inertia of the system relatively decreases, which affects a fast frequency response speed of the system, thereby greatly reducing the stability of the power grid.

In order to improve the fast frequency capability of new energy field-stations and improve the stability of the power grid, a method of remolding an existing energy management platform of the power grid is generally employed. However, with this method, a response accuracy of the primary frequency modulation of the generator set is low, resulting in that the frequency modulation actions of the overall generator set are inconsistent; and a response speed of the primary frequency of the generator set is slow, resulting in poor stability of the electric power system.

SUMMARY

A photovoltaic power plant and a primary frequency modulation control method for the same are provided according to an embodiment of the present application, a response speed and accuracy of primary frequency modulation of a generator set of a photovoltaic power plant can be improved, and motions of generator sets are consistent, and the stability of an electric power system is high.

According to an aspect of an embodiment of the present application, a photovoltaic power plant is provided. The photovoltaic power plant includes a photovoltaic power station and an active power control system, wherein the photovoltaic power station includes photovoltaic arrays and photovoltaic inverters. The photovoltaic inverters are configured to convert direct current electrical energy generated by the photovoltaic arrays to alternating current electrical energy. The active power control system is configured to determine, in a case that a frequency value at a grid connection point of the photovoltaic power plant satisfies a preset primary frequency modulation triggering condition, a single-unit active power variation according to an operating state of each of the photovoltaic inverters, to adjust an output active power of the photovoltaic inverter.

According to another aspect of the embodiment of the present application, a primary frequency modulation control method is provided, which is used in the photovoltaic power plant described in the above embodiment. The primary frequency modulation control method includes: monitoring a frequency value at a grid connection point of the photovoltaic power plant; determining, in a case that the frequency value at the grid connection point is determined to satisfy a preset primary frequency modulation triggering condition, a single-unit active power variation according to an operating state of each of the photovoltaic inverters; and adjusting an output active power of each of the photovoltaic inverters according to the single-unit active power variation.

With the photovoltaic power plant and the primary frequency modulation control method for the same according to the embodiment of the present application, the benefits including, but not limited to the following items can be obtained: the response speed and accuracy of the primary frequency modulation of the generator set of the photovoltaic power plant can be improved, the motions of the generator sets are consistent, and the stability of the electric power system is high.

BRIEF DESCRIPTION OF DRAWINGS

For more clearly illustrating embodiments of the present application or the technical solutions in the conventional technology, drawings referred to describe the embodiments or the conventional technology will be briefly described hereinafter. For those skilled in the art, other drawings may be obtained based on these drawings without any creative efforts.

DETAILED DESCRIPTION

Features in various aspects and exemplary embodiments of the present application are described in detail below. In order to make the objects, technical solutions and advantages of the present application more clear, the present application is further described in detail below in conjunction with the drawings and embodiments. It should be understood that, the specific embodiments described herein are merely used to illustrate the present application and are not intended to limit the present application. For those skilled in the art, the present application may be implemented without some of these specific details. The following descriptions of the embodiments are merely intended to provide better understanding of the present application by illustrating examples of the present application.

It should be noted that, in this application, the terms such as "first", "second" and the like are used merely to distinguish one entity or operation from another entity or operation, and do not necessarily require or imply that there is any actual relationship or order between these entities or operations. Furthermore, the terms "include" or "comprise" or any other variants thereof is intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

In order to better understand the present application, the embodiments according to the present application will be described in detail below with reference to the drawings. It should be noted that, these examples are not intended to limit the scope of the present application.

Figure 1:
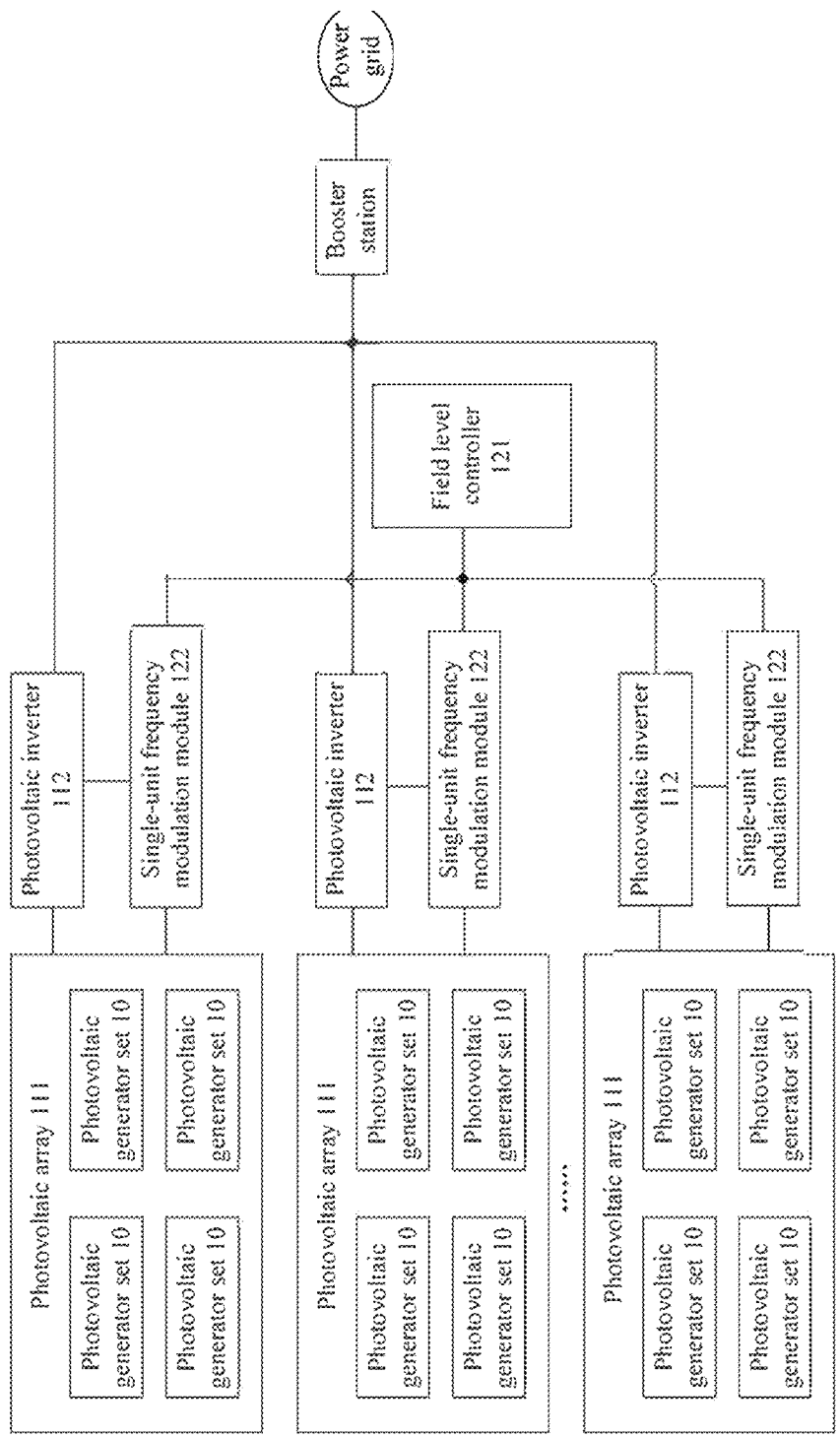
FIG. 1 is a schematic view showing a frame structure of a photovoltaic power plant according to an embodiment of the present application.

As shown in FIG. 1, in an embodiment, a photovoltaic power plant includes a photovoltaic power station and an active power control system. The photovoltaic power station includes multiple photovoltaic arrays 111 and multiple photovoltaic inverters 112, each of the photovoltaic inverters 112 is connected to corresponding photovoltaic generator sets 10 in a corresponding photovoltaic array 111, and the multiple photovoltaic inverters 112 are configured to convert direct current electrical energy generated by the multiple photovoltaic arrays 111 to alternating current electrical energy. The active power control system is configured to determine, in a case that a frequency value at a grid connection point of the photovoltaic power plant satisfies a preset primary frequency modulation triggering condition, a single-unit active power variation according to an operating state of each of the photovoltaic inverters 112, to control the photovoltaic power plant to perform a primary frequency modulation. Specifically, an output active power of each of the photovoltaic inverters is adjusted according to the operating state of each of the photovoltaic inverters 112.

In the embodiment of the present application, the active power control system employs a centralized control scheme to adjust an active power of an entire power grid, and to allow the photovoltaic power plant to participate in the primary frequency modulation of an electric power system. In a case that the frequency value at the grid connection point of the photovoltaic power plant satisfies the preset primary frequency modulation triggering condition, the active power control system adjusts an output power of each of the photovoltaic inverters according to the operating state of each of the photovoltaic inverters. Motions of the photovoltaic inverters are consistent, an entire field control has a high speed and a high accuracy, which increases the stability of the system, and thereby improving the grid connection friendliness of the wind power.

With continued reference to FIG. 1, in the embodiment, the active power control system may include a field level controller 121 and multiple single-unit frequency modulation modules 122. The field level controller 121 is arranged at a booster station of the photovoltaic power plant. The field level controller 121 is configured to, in a case that the frequency value at the grid connection point is determined to satisfy the primary frequency modulation triggering condition, calculate a total active power increment value at the grid connection point based on the frequency value at the grid connection point, generate a single-unit primary frequency modulation command according to the operating state of each of the photovoltaic inverters 112, and send the single-unit primary frequency modulation command to a corresponding photovoltaic inverter 112. Each of the single-unit frequency modulation modules 122 is connected to the corresponding photovoltaic inverter 112, and the single-unit frequency modulation module 122 is configured to receive the single-unit primary frequency modulation command, and adjust the output active power of the corresponding photovoltaic inverter 112 according to the single-unit primary frequency modulation command.

In the embodiment of the present application, the booster station is used for performing voltage-boosting processing of the converted alternating current electrical energy, and transmitting the high-voltage alternating current electrical energy obtained by the voltage-boosting processing to the power grid.

Figure 2:
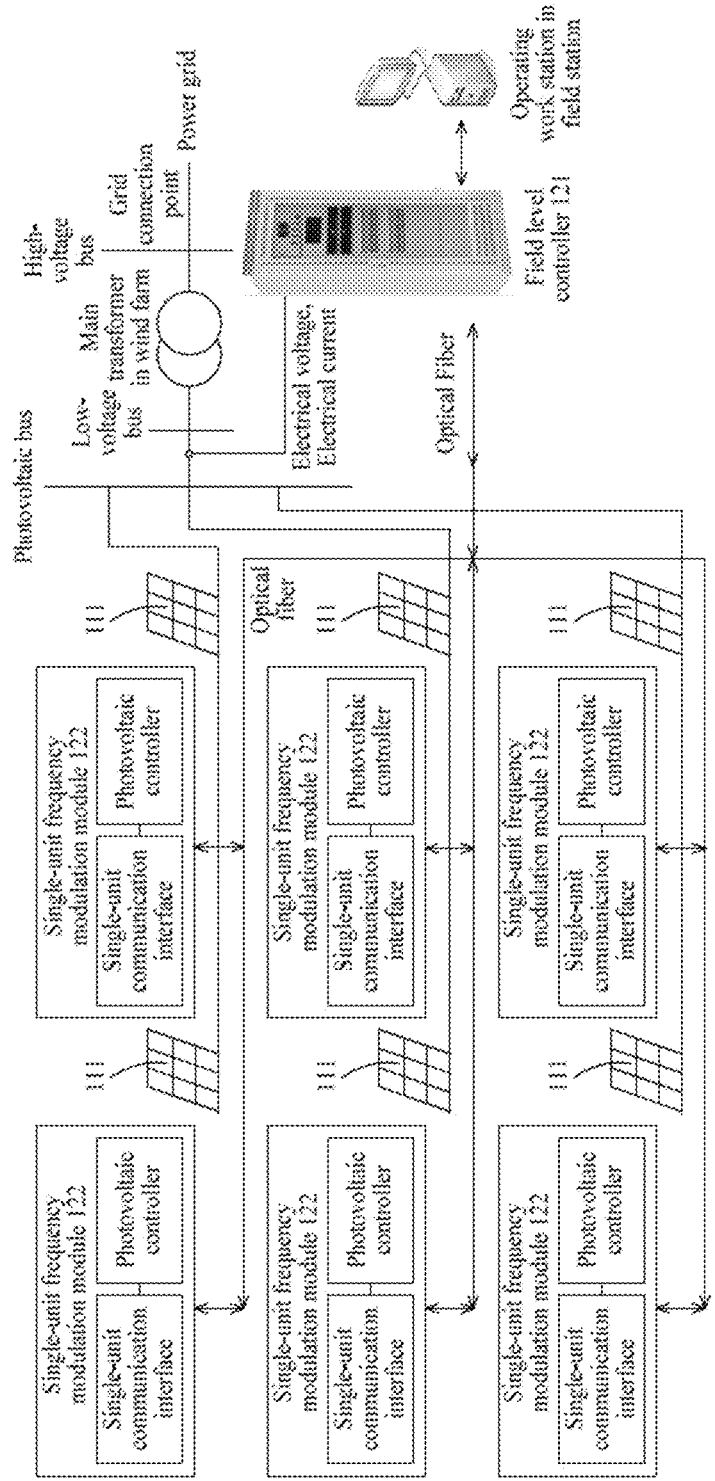
FIG. 2 is a schematic view of showing a topological structure of a photovoltaic power plant according to an exemplary embodiment of the present application.

Reference numerals for the same or equivalent components in FIGS. 1 and 2 are the same.

As shown in FIG. 2, in a photovoltaic power plant according to an embodiment, each of the photovoltaic inverters (not shown in the figure) may be connected to the corresponding photovoltaic generator sets 10 in the corresponding photovoltaic array 111, and the photovoltaic inverter converts the direct current electrical energy generated by the connected photovoltaic array 111 to the alternating current electrical energy, and converges the obtained alternating current electrical energy into a photovoltaic bus. The photovoltaic bus transmits the alternating current electrical energy to a low voltage bus through a cable connection with the low voltage bus. The low voltage bus is connected to a high voltage bus through the booster station, the alternating current electrical energy in the low voltage bus is converted into the alternating current electrical energy that satisfies the requirements of the power grid by the voltage-boosting processing, and then the alternating current electrical energy is connected to the power grid through the grid connection point on the high voltage bus.

As a meticulous energy management platform, the field level controller 121 takes a real-time detected frequency value at the grid connection point as a power grid frequency, which may solve the problem that the frequency acquisition is inaccurate due to relatively large voltage harmonics at an inverter outlet when acquiring the power grid frequency by the photovoltaic inverter, and the problem that motion characteristics of the entire field are inconsistent due to the different frequencies acquired by the photovoltaic inverters, thereby improving the measurement accuracy of the power grid frequency detection and improving the consistency of motions of the primary frequency modulation.

With continued reference to FIG. 2, the field level controller 121 of the active power control system may be connected to each of the single-unit frequency modulation modules 122 through an optical fiber. The field level controller 121 transmits and issues the single-unit frequency modulation command to each of the single-unit frequency modulation modules 122 through the optical fiber, and each of the single-unit frequency modulation modules 122 controls, through the single-unit frequency modulation command, the corresponding photovoltaic inverter to perform the single-unit primary frequency modulation motion. A dynamic frequency response of the active power control system is fast, which can meet the requirement required by the power grid for a response speed with a photovoltaic field station participating in the fast frequency response.

The basic principle of a photovoltaic power plant 100 according to the embodiment of the present application participating in the primary frequency modulation through an active power control system 120 is described hereinafter in detail with reference to FIG. 3. For convenience of description, in the following description of the embodiments, a curve in FIG. 3 showing that an output power of the photovoltaic power plant responds to frequency fluctuation at a grid connection point may be abbreviated as an active power/frequency characteristic curve.

Figure 3:
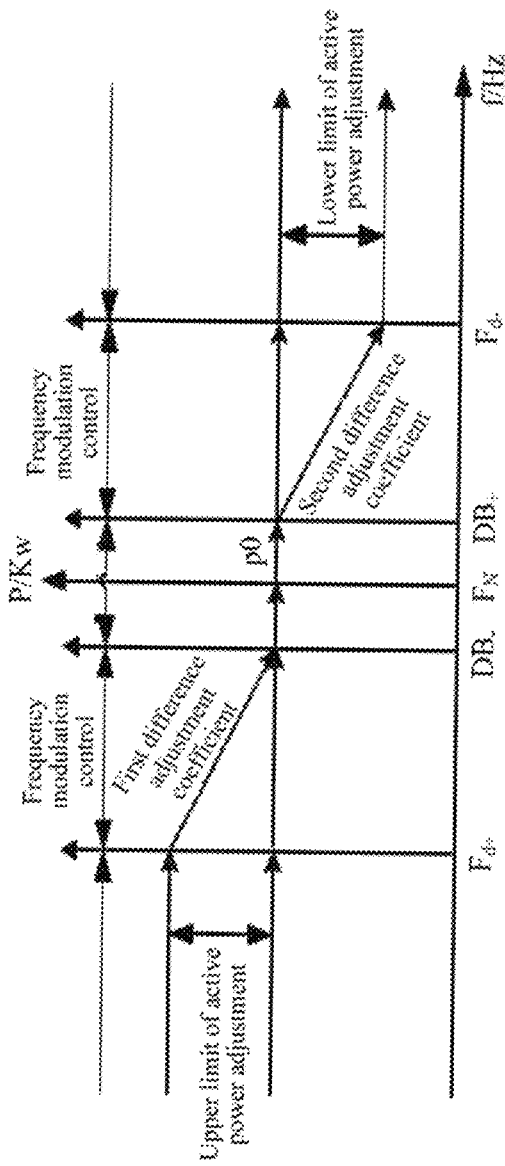
FIG. 3 is a curve diagram showing that an output power of the photovoltaic power plant responds to frequency fluctuation at a grid connection point in the embodiment of the present application.

As shown in FIG. 3, the active power control system according to the embodiment of the present application can monitor the frequency fluctuation at the grid connection point of the photovoltaic power plant, and achieve the primary frequency modulation control of the photovoltaic power plant by coordinately controlling the active power of the entire photovoltaic power plant. The active power control system of the photovoltaic power plant can achieve a function of fast frequency response of the photovoltaic power field-station through a given active power/frequency characteristic curve.

In the embodiment of the present application, as shown FIG. 3, during an operation process of the photovoltaic power plant, in a case that the frequency value at the grid connection point f is offset from a fundamental frequency value $f_N$, and a frequency offset $\Delta f$ does not exceed a set dead band frequency range, in order to maintain stable operation of a photovoltaic generator set, the active power control system 120 is not required to perform an active power adjustment for the small fluctuation of the power grid frequency.

In the embodiment of the present application, a dead band frequency is a frequency offset which is set to avoid unnecessary motions of the active power control system in a case that the frequency at the grid connection point is offset. The dead band frequency may include a positive dead band threshold $DB_+$ and a negative dead band threshold $DB_-$, and both the positive dead band threshold $DB_+$ and the negative dead band threshold $DB_-$ can be set according to an actual operating state of the power grid. Therefore, the absolute values of the positive dead band threshold $DB_+$ and the negative dead band threshold $DB_-$ may be the same or may be different.

In this example, according to the fundamental frequency value $f_N$, the positive dead band threshold $DB_+$ and the negative dead band threshold $DB_-$, a motion threshold of the fast frequency response $f_d$ of the active power control system 120 can be determined, and the motion threshold of the fast frequency response $f_d$ includes:

(1) a positive threshold of a fast frequency response $f_{d+}$ corresponding to the positive dead band threshold $DB_+$, where, $f_{d+}=f_N+DB_+$; and (2) a negative threshold of the fast frequency response $f_{d-}$ corresponding to the negative dead band threshold $DB_-$, where, $f_{d-}=f_N+DB_-$.

As shown in FIG. 3, in a case that the power grid frequency f is greater than the positive threshold of the fast frequency response $f_{d+}$, or the grid frequency f is smaller than the negative threshold of the fast frequency response $f_{d-}$, the photovoltaic power plant 100 is triggered to allow the active power control system 120 to perform the primary frequency modulation.

As an example, the fundamental frequency value of the photovoltaic power plant $f_N$ may be, for example, 50 Hz, and the positive dead band threshold $DB_+$ is 0.06 Hz, and the negative dead band threshold $DB_-$ is −0.06 Hz. According to the fundamental frequency value $f_N$, the positive dead band threshold $DB_+$ and the negative dead band threshold $DB_-$, the motion threshold of the fast frequency response $f_d$ can be determined, wherein the positive threshold of the fast frequency response $f_{d+}$ is 50.06 Hz, and the negative threshold of the fast frequency response $f_{d-}$ is 49.94 Hz. In a case that f≥50.06 Hz or f≤49.94 Hz, the photovoltaic power plant 100 is triggered to allow the active power control system 120 to perform the primary frequency modulation.

In an embodiment, a relationship that the active power at the grid connection point changes with the frequency value at the grid connection point in the active power/frequency characteristic curve may be expressed by the following expression (1).

$$p = p_0 - p_N \times \frac{(f - f_d)}{f_N} \times \frac{1}{\delta\%} \quad (1)$$

In the above expression (1), P represents an active power value at the grid connection point obtained by real-time calculation according to the fluctuation of the frequency value at the grid connection point, $p_0$ represents an active power initial value (abbreviated as a power initial value $p_0$ hereinafter) before the primary frequency modulation of the photovoltaic power plant is performed, $p_N$ represents a rated power of the photovoltaic power plant, f represents the detected frequency value at the grid connection point, $f_d$ represents the motion threshold of the fast frequency response, $f_N$ represents the preset fundamental frequency value, and 6% represents a difference adjustment coefficient of the photovoltaic generator set in the photovoltaic power plant.

In the above expressions, in a case that the frequency value f at the grid connection point exceeds the motion threshold of the fast frequency response $f_d$, the difference adjustment coefficient of the photovoltaic generator set is a slope of the active power/frequency characteristic curve.

In addition, in the above expression (1), $$-p_N \times \frac{(f - f_d)}{f_N} \times \frac{1}{\delta\%}$$

may represent, in a cast that the frequency value at the grid connection point f exceeds the motion threshold of the fast frequency response $f_d$, an active power increment value at the grid connection point DeltP1. That is, the active power increment value at the grid connection point DeltP1, in a case that f exceeds the motion threshold of the fast frequency response $f_d$, can be expressed by the following expression (2).

$$DeltP1 = -p_N \times \frac{(f - f_d)}{f_N} \times \frac{1}{\delta\%} \quad (2)$$

In an embodiment, the expression (2) may also be expressed as the following expression (3), and the expression (2) and the expression (3) are two different expressions of the active power increment value DeltP1.

$$DeltP1 = p_N \times \frac{(f_d - f)}{f_N} \times \frac{1}{\delta\%} \quad (3)$$

According to the expression (3), the above expression (1) can also be expressed as the following expression (4), and the expression (1) and the expression (4) are two different expressions of the active power value P:

$$p = p_0 + p_N \times \frac{(f_d - f)}{f_N} \times \frac{1}{\delta\%} \quad (4)$$

In an embodiment, in a case that $f_{d-} \leq f \leq f_{d+}$, it is considered that the frequency value at the grid connection point is in the frequency dead band, in a case that $f \geq f_{d+}$, it is considered that the frequency value at the grid connection point exceeds the frequency dead band and is higher than the frequency dead band, and in a case that $f \leq f_{d-}$, it is considered that the frequency value at the grid connection point exceeds the frequency dead band and is lower than the frequency dead band.

With continued reference to FIG. 3, in an embodiment, in a case that high-frequency disturbance of the power grid occurs, the frequency value at the grid connection point is higher than the frequency dead band, that is, $f \geq f_{d+}$, it can be concluded from the above expression (2) or expression (3) that, the active power increment value DeltP of the entire photovoltaic power plant is smaller than zero, and the active power value P at the grid connection point is smaller than the active power initial value $p_0$. Therefore, the active power of the photovoltaic power plant is required to be reduced.

With continued reference to FIG. 3, in an embodiment, in a case that low-frequency disturbance of the power grid occurs, the frequency value at the grid connection point is lower than the frequency dead band, that is, $f \geq f_{d-}$, it can be concluded from the above expression (2) or expression (3) that the active power increment value DeltP of the entire photovoltaic power plant is greater than zero, and the active power value P at the grid connection point is greater than the active power initial value $p_o$. Therefore, the active power of the photovoltaic power plant is required to be increased.

In an embodiment, since there is an upper limit threshold of active power contribution in the contribution of the photovoltaic power plant to the active power of the power grid has, when the active power of the photovoltaic power plant is adjusted, there is an adjustable power limit of an adjustable power value, and the adjustable power limit includes an increasable power limit and a reducible power limit.

That is, when the active power of the photovoltaic power plant is adjusted, the increasable power value may be smaller than the preset increasable power limit, and the reducible power value may be smaller than the reducible power limit. As an example, both the increasable power limit and the reducible power limit may be set to be a minimum output limit value of the photovoltaic power plant which is 10% $P_N$.

In an embodiment, the active power can no longer be reduced in a case that it is reduced to the active power lower threshold at the grid connection point. For example, the minimum output limit value of the photovoltaic power plant is set to be 10% $P_N$, to prevent the photovoltaic power plant from being disconnected from the power grid due to the adjustment in the frequency modulation process.

As an example, in a situation of the high-frequency disturbance of the power grid, the active power can no longer be reduced in a case that it is reduced to 10% of a rated output, and the increasable power limit and the reducible power limit of the primary frequency modulation can be set to be 10% of the rated output of the photovoltaic power plant.

In an embodiment of the present application, based on the active power/frequency characteristic curve shown in FIG. 3, in a case that the frequency offset of the power grid occurs and the primary frequency modulation is triggered, a total active increment at the grid connection point may be calculated according to the real-time frequency at the grid connection point. The active power increment at the grid connection point of the photovoltaic power plant is allocated according to the operating state of each of the photovoltaic inverters by a centralized control system, and is distributed to each of the photovoltaic inverters.

It should be noted that, the photovoltaic power plant according to the embodiment of the present application does not include an energy storage device, and the active power output of the photovoltaic inverter is controlled by the active power control system.

A specific process of performing the primary frequency modulation control by the active power control system of the photovoltaic power plant according to an embodiment of the present application will be described in detail hereinafter with reference to the drawings and specific embodiments.

Figure 4:
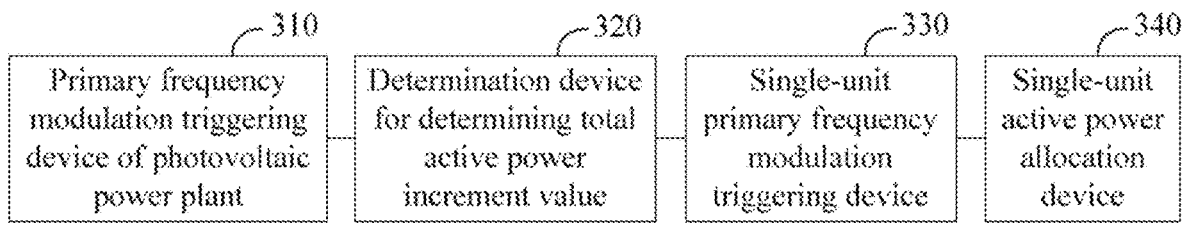
FIG. 4 is a schematic view showing the specific structure of a field level controller according to the embodiment of the present application.

As shown in FIG. 4, in an embodiment, the field level controller 121 may include a photovoltaic power plant primary frequency modulation triggering device 310, a determination device for determining a total active power increment value 320, a single-unit primary frequency modulation triggering device 330, and a single-unit active power allocation device 340.

The primary frequency modulation triggering device 310 of the photovoltaic power plant is configured to monitor the frequency value at the grid connection point, and adjust, in a case that the monitored frequency value at the grid connection point is offset from a preset fundamental frequency value and the frequency offset satisfies the primary frequency modulation triggering condition, the output active power of each of the photovoltaic inverters. The primary frequency modulation triggering condition includes that the frequency value at the grid connection point is greater than a preset positive dead band threshold, or the frequency value at the grid connection point is smaller than a preset negative dead band threshold.

A determination device for determining the total active power increment value 320 is configured to determine, in a case that the frequency offset satisfies the primary frequency modulation triggering condition, a total active power control target value at the grid connection point according to the detected active power initial value of the photovoltaic power plant before the primary frequency modulation, the frequency value at the grid connection point and an AGC command value of the automatic generation control of the power grid; and calculate the total active power increment value at the grid connection point according to the total active power control target value.

The single-unit primary frequency modulation triggering device 330 is configured to determine, based on that whether the operating state of each of the photovoltaic inverters is normal and whether a preset single-unit active power allocation condition is satisfied in the photovoltaic power station, photovoltaic inverters to be frequency-modulated that are allowed to participate in primary frequency modulation of the photovoltaic power station.

The single-unit active power allocation device 340 is configured to allocate the total active power increment value according to an operating state of each of the photovoltaic inverters to be frequency-modulated, to obtain an output power target value of each of the photovoltaic inverters to be frequency-modulated; and send a single-unit primary frequency modulation command including the output power target value, a preset power adjustment step size and an adjustment rate to each of the photovoltaic inverters to be frequency-modulated.

In this embodiment, a state of the power grid is monitored in real time, the total active power increment value at the grid connection point is calculated, the photovoltaic inverters to be frequency-modulated that are allowed to participate in the primary frequency modulation of the photovoltaic power station are determined based on the operating state of each of the photovoltaic inverters in the photovoltaic power station, the output power of each of the photovoltaic inverters to be frequency-modulated is adjusted to participate in the primary frequency modulation, and the active increment of the entire plant is allocated reasonably.

Figure 5:
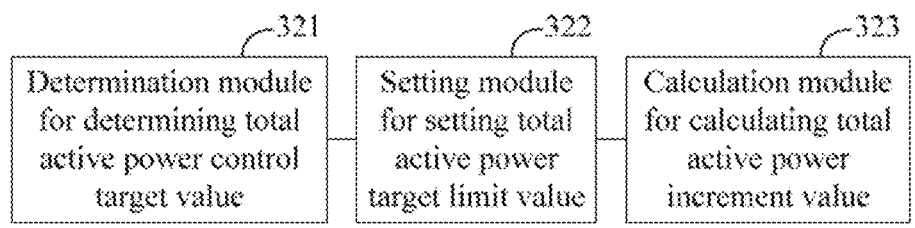
FIG. 5 is a schematic view showing the specific structure of a determination device for determining a total active power increment value 320 in FIG. 4.

As shown in FIG. 5, in an embodiment, the determination device for determining the total active power increment value 320 may include: a determination module for determining the total active power control target value 321, a setting module for setting a total active power target limit value 322, and a calculation module for calculating the total active power increment value 323; wherein the determination module for determining the total active power control target value 321 is configured to determine, in a case that the frequency offset at the grid connection point satisfies the primary frequency modulation triggering condition, the total active power control target value at the grid connection point according to the active power initial value of the photovoltaic power plant, the frequency value at the grid connection point, and an AGC command value.

In an embodiment, the determination module for determining the total active power control target value 321 may include: a calculation unit for calculating a primary frequency modulation active increment value, a calculation unit for calculating an AGC command active increment value, a calculation unit for calculating a first total control target value, a calculation unit for calculating a second total control target value, and a calculation unit for calculating a third total control target value.

The calculation unit for calculating the primary frequency modulation active increment value is configured to calculate the frequency offset at the grid connection point according to the detected frequency value at the grid connection point, and calculate an active power increment value of the frequency offset at the grid connection point according to the frequency offset at the grid connection point.

The calculation unit for calculating the AGC command active increment value is configured to take, according to a current AGC command value and a previous AGC command value of the power grid, a difference between the current AGC command value and the previous AGC command value as an active power increment value of the current AGC command.

The calculation unit for calculating the first total control target value is configured to set, in a case that a first active increment control condition is satisfied, the total active power control target value at the grid connection point to be an algebraic sum of adding the active power increment value of the current AGC command and the active power increment value of the frequency offset to the active power initial value, to obtain an active total active power increment value at the grid connection point.

As an example, the first active increment control condition includes any one of the following conditions:

(1) the frequency value at the grid connection point is within an allowable variation range of the frequency at the grid connection point; and (2) the frequency value at the grid connection point exceeds the allowable variation range of the frequency at the grid connection point and an adjustment direction of the current ACG command value is the same as an adjustment direction of the active power increment value of the frequency offset.

The calculation unit for calculating the second total control target value is configured to, in a case that a second active increment control condition is satisfied, keep the AGC command value of the power grid to be the previous AGC command value, and add the active power increment value of the frequency offset to the active power initial value, to obtain the active total active power increment value at the grid connection point.

As an example, the second active increment control condition includes:
(1) the frequency value at the grid connection point exceeds the allowable variation range of the frequency at the grid connection point; and
(2) the adjustment direction of the current ACG command value is different from the adjustment direction of the active power increment value of the frequency offset.

The setting module for setting the total active power target limit value 322 is configured to set, in a case that an active power control target value at the grid connection point is lower than a preset active power lower threshold at the grid connection point, the active power control target value at the grid connection point to be the active power lower threshold.

The calculation unit for calculating the third total control target value is configured to set, in a case that a third active increment control condition is satisfied, the total active power control target value at the grid connection point to be the current AGC command value.

As an example, the third active increment control condition includes:
the frequency offset at the grid connection point is greater than the negative dead band threshold and is smaller than the positive dead band threshold; the adjustment directions are the same indicates that both the active power increment value of the current AGC command value and the active power increment value of the frequency offset are positive or negative, and the adjustment directions are different indicates that the active power increment value of the AGC command and the active power increment value of the frequency offset are not positive at the same time or negative at the same time.

As an example, in a case that the frequency value at the grid connection point is greater than the negative threshold of the fast frequency response and smaller than the positive threshold of the fast frequency response, the frequency offset at the grid connection point does not exceed the frequency dead band, which may be expressed as $50+DB_-\le f \le 50+DB_+$ as an example.

In this embodiment, the fast frequency response function of the photovoltaic power plant should be coordinated with AGC control, that is, the active power control target value at the grid connection point should be an algebraic sum of the AGC command value and a fast frequency response adjustment amount. In a case that the power grid frequency exceeds the allowable variation range of the frequency at the grid connection point such as 50±0.1 Hz, the new energy fast frequency response blocks an AGC reverse adjustment command.

As an example, the active power control target value at the grid connection point is obtained by continuously adding the active power increment value of the frequency offset and the active power increment value of the current AGC command to the active power initial value of the photovoltaic power plant. In a case that the power grid frequency exceeds the allowable variation range of the frequency at the grid connection point, on the basis of maintaining the active power increment value of the previous AGC command, the active power increment value of the current AGC command is no longer added.

In a specific example, the AGC command may be a secondary frequency modulation command. The fast frequency response function of the photovoltaic power plant should be coordinated with the AGC control. In a case that the power grid frequency exceeds the frequency dead band and is smaller than 50±0.1 Hz, the active power control target value of the new energy field station should be an algebraic sum of the AGC command value and the fast frequency response adjustment amount. In a case that the power grid frequency exceeds 50±0.1 Hz, the fast frequency response of the new energy field station blocks the AGC reverse adjustment command.

An example of the case that an excess amount is smaller than 0.1 Hz: assuming that the frequency dead band of the power grid is ±0.06 Hz, the current frequency value is 50.08 Hz, the entire plant participates in the primary frequency modulation of the system, and DeltP=−500 kW. During this period, a first assumption: the secondary frequency modulation command is that a power of the entire plant is required to be increased from 30,000 kW to 30,500 kW, and in this case, a total operating power of the entire plant is 30500−500=30000 kW; a second assumption: the secondary frequency modulation command is that the power of the entire plant is required to be decreased from 30,000 kW to 29,500 kW, and in this case, the total operating power of the entire plant is 29500−500=29000 kW (that is, regardless of the direction of the primary frequency modulation and the secondary frequency modulation, an algebraic sum is always employed).

An example of the case that the excess amount is greater than 0.1 Hz: assuming that the frequency dead band of the power grid is ±0.06 Hz, the current frequency value is 50.12 Hz, the entire plant participates in the primary frequency modulation of the system, and DeltP=−1500 kW. During this period, a first assumption: the secondary frequency modulation command is that the power of the entire plant is required to be increased from 30,000 kW to 30,500 kW, and in this case, the total operating power of the entire plant is 30000−1500=28500 kW; a second assumption: the secondary frequency modulation command is that the power of the entire plant is required to be decreased from 30,000 kW to 29,500 kW, and in this case, the total operating power of the entire plant is 29500−1500=28000 kW (that is the blocking logic of the primary frequency modulation and the second frequency modulation, in a case that the adjustment directions are the same, the primary frequency modulation command and the second frequency modulation command are added; and in a case that the adjustment directions are opposite, the secondary frequency modulation command is blocked).

The specific steps of calculating the frequency offset at the grid connection point according to the frequency value at the grid connection point in an embodiment of the present application are described hereinafter with a specific example, in this example:

in a case that the frequency value at the grid connection point is greater than or equal to a minimum frequency value of a fast frequency response, and the frequency value at the grid connection point is smaller than the negative threshold of the fast frequency response, a difference between the negative threshold of the fast frequency response and the frequency value at the grid connection point is taken as the frequency offset at the grid connection point.

That is, in a case that $f_{min} < f < f_N + DB_-$, the frequency offset at the grid connection point $Deltf = f_N - f + DB_-$.

In a case that the frequency value at the grid connection point is greater than the positive threshold of the fast frequency response, and is smaller than or equal to a maximum frequency value of the fast frequency response, a difference between the positive threshold of the fast frequency response and the frequency value at the grid connection point is taken as the frequency offset at the grid connection point.

That is, in a case that $f_N+DB_-<f<f_{max}$, the frequency offset at the grid connection point $Deltf=f_N-f+DB_+$.

In a case that the frequency value at the grid connection point is smaller than the minimum frequency value of the fast frequency response, a difference between the negative threshold of the fast frequency response and the minimum frequency value of the fast frequency response is taken as the frequency offset at the grid connection point.

That is, in a case that $f<f_{min}$, the frequency offset at the grid connection point $Deltf=f_N-f_{min}+DB_-$.

In a case that the frequency value at the grid connection point is greater than the maximum frequency value of the fast frequency response, a difference between the positive threshold of the fast frequency response and the maximum frequency value of the fast frequency response is taken as the frequency offset at the gird interconnection point.

That is, in a case that $f>f_{max}$, the frequency offset at the grid connection point $Deltf=f_N-f_{max}+DB_+$.

Wherein, the negative threshold of the fast frequency response $f_{d-}$ is a sum of the fundamental frequency value $f_N$ and the negative dead band threshold $DB_-$, and the positive threshold of the fast frequency response $f_{d+}$ is a sum of the fundamental frequency value $f_N$ and the positive dead band threshold $DB_+$.

In the above expressions, when calculating the active power increment value of the frequency offset at the grid connection point according to the frequency offset at the grid connection point, the calculation unit for calculating the primary frequency modulation active increment value is specifically configured to:

use the expression $$DeltP_1 = P_N \times \frac{Deltf}{f_N} \times \frac{1}{\delta\%}$$

to calculate the active power increment value of the frequency offset at the grid connection point, wherein, $DeltP_1$ is the active power increment value of the frequency offset, and Deltf is the frequency offset at the grid connection point obtained by calculation, $P_N$ is the rated power of the photovoltaic power plant, $f_N$ is the fundamental frequency value, and 6% is a preset difference adjustment coefficient of the primary frequency modulation.

As a specific example, in a case that the preset fundamental frequency value $f_N$ is 50 Hz, the above expression $$DeltP_1 = P_N \times \frac{Deltf}{f_N} \times \frac{1}{\delta\%}$$

may be specifically represented as follows.

In a case that $f_{min} \leq f<50+DB_-$, the active power control target value at the grid connection point corresponding to the frequency offset at the grid connection point is calculated by the following expression (5):

$$P_1 = P_0 + \frac{\frac{(50-f+DB_-)}{50}}{\delta\%} * P_N \qquad (5)$$

In a case that $50+DB_+<f\leq f_{max}$, the active power control target value at the grid connection point corresponding to the frequency offset at the grid connection point is calculated by the following expression (6):

$$P_1 = P_0 + \frac{\frac{(50-f+DB_+)}{50}}{\delta\%} * P_N \qquad (6)$$

In a case that $f<f_{min}$, the active power control target value at the grid connection point corresponding to the frequency offset at the grid connection point is calculated by the following expression (7):

$$P_1 = P_0 + \frac{\frac{(50-f_{min}+DB_-)}{50}}{\delta\%} * P_N \qquad (7)$$

In a case that $f>f_{max}$, the active power control target value at the grid connection point corresponding to the frequency offset at the grid connection point is calculated by the following expression (8):

$$P_1 = P_0 + \frac{\frac{(50-f_{max}+DB_+)}{50}}{\delta\%} * P_N \qquad (8)$$

In the above expressions (5) to (8), $P_1$ is the active power control target value at the grid connection point corresponding to the frequency offset at the grid connection point, f is the detected frequency value at the grid connection point, $P_0$ is the active power initial value at the grid connection point detected before the primary frequency modulation is performed, Deltf is the frequency offset at the grid connection point obtained by calculation, $P_E$ is the rated power of the photovoltaic power plant, $f_N$ is the fundamental frequency value, δ% is the preset difference adjustment coefficient of the primary frequency modulation, $f_{max}$ is the maximum frequency value of the fast frequency response, and $f_{min}$ is the minimum frequency value of the fast frequency response.

The calculation module for calculating the total active power increment value is configured to take a difference between the total active power control target value and the active power initial value of the photovoltaic power plant as the total active power increment value at the grid connection point.

Figure 6:
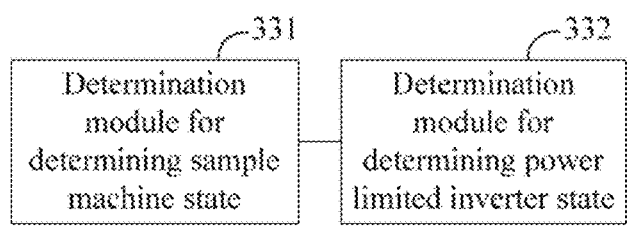
FIG. 6 is a schematic view showing the specific structure of a single-unit primary frequency modulation triggering device according to the embodiment of the present application in FIG. 4.

FIG. 6 is a schematic view showing a specific structure of a single-unit primary frequency modulation triggering device according to an embodiment of the present application in FIG. 4. As shown in FIG. 6, in an embodiment, the single-unit primary frequency modulation triggering device 330 may include:

a determination module for determining a sample machine state, which is configured to determine, in a case that sample machines satisfy a preset fault-free operating condition, that the sample machines are in a normal operating state.

As an example, the sample machines are configured to operate according to a rated power of the photovoltaic inverter, and a sample machine corresponding to each of the power limited inverters is selected according to preset sample machine selection steps, and the sample machine selection steps include:

step 01, multiple groupings of the photovoltaic inverters are obtained, and photovoltaic inverters having similar geographical locations and a same output capacity are screened out of the photovoltaic inverters in each of the groupings; and step 02, a photovoltaic inverter is selected from the photovoltaic inverters obtained by screening to be the sample machine, and the photovoltaic inverters other than the sample machine in the grouping are taken as the power limited inverters.

In this embodiment, among the photovoltaic inverters in each of the groupings, the sample machine is selected from the inverters having the similar geographical locations and the same capacity, and the sample machine is used for full-power operation at the rated power. In the primary frequency modulation, an output power of the sample machine is not required to be adjusted.

As an example, the fault-free operating condition includes that, in a case that each of the sample machines or each of the power limited inverters is taken as a component to be determined, the component to be determined satisfies the following conditions:

a communication interface of the component to be determined is normal, the component to be determined has no fault alarm, a measured active power of the component to be determined is greater than or equal to the preset active power lower threshold at the grid connection point, and an active power variation rate of the component to be determined is smaller than an active power variation rate threshold.

A determination module for determining a power limited inverter state 332 is configured to determine, in a case that the power limited inverters satisfy the preset fault-free operating condition and the sample machines corresponding to the power limited inverters satisfy the preset fault-free operating condition at the same time, that the power limited inverters are in a normal operating state.

As an example, the following conditions are required to be satisfied at the same time for determining that the sample machine corresponding to the current inverters is fault-free:
(1) the sample machine communicates normally;
(2) the sample machine has no fault alarm signal;
(3) an active power measurement value of the sample machine is greater than 10% of a rated capacity; and
(4) the active power variation rate of the sample machine is less than 5 kW/s.

As an example, the following conditions are required to be satisfied at the same time for determining that the current inverters are fault-free:
(1) communication is normal;
(2) the generator set has no fault alarm signal;
(3) an active power measurement value is greater than 10% of the rated capacity;
(4) the active power variation rate is less than 5 kW/s; and
(5) the corresponding sample machine operates normally.

Figure 7:
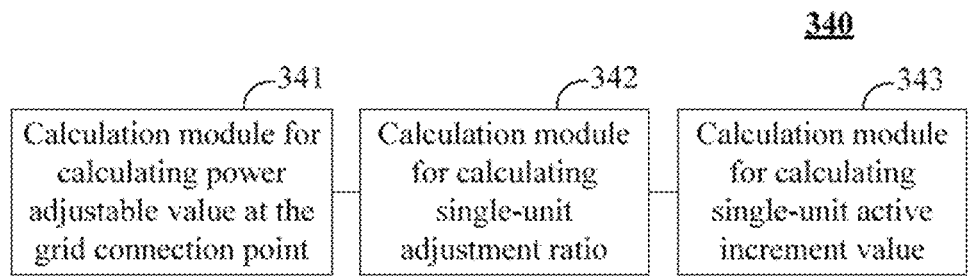
FIG. 7 is a schematic view showing the specific structure of a single-unit active power allocation device in FIG. 4.

FIG. 7 is a schematic view showing a specific structure of a single-unit active power allocation device in FIG. 4. As shown in FIG. 7, in an embodiment, the single-unit active power allocation device 340 specially includes:

a calculation module for calculating a power adjustable value at the grid connection point 341, which is configured to calculate, according to the total active power increment value at the grid connection point and an acquired active power value of each of the photovoltaic inverters to be frequency-modulated, an active power adjustable value at the grid connection point. The active power adjustable value at the grid connection point includes an active power increasable value at the grid connection point or an active power reducible value at the grid connection point.

In an embodiment, the calculation module for calculating the power adjustable value at the grid connection point 341 may include a calculation unit for calculating a power increasable value at the grid connection point and a calculation unit for calculating a power reducible value at the grid connection point.

Specifically, the calculation unit for calculating the power increasable value at the grid connection point is configured to, in a case that the total active power increment value at the grid connection point is greater than zero and greater than a preset maximum increasable power limit, take a difference between an active power value of the sample machine corresponding to each of the photovoltaic inverters to be frequency-modulated and an active power value of a present photovoltaic inverter to be frequency-modulated as an increasable power value of the photovoltaic inverter to be frequency-modulated, and take a sum of increasable power values of the photovoltaic inverters to be frequency-modulated as an active power increasable value at the grid connection point.

Specifically, the calculation unit for calculating the power reducible value at the grid connection point is configured to, in a case that the total active power increment value at the grid connection point is smaller than zero and smaller than a preset maximum reducible active power limit, take a difference between the active power value of each of the photovoltaic inverters to be frequency-modulated and the active power lower threshold at the grid connection point as a reducible power value of each of the photovoltaic inverters to be frequency-modulated, and take a sum of reducible power values of the photovoltaic inverters to be frequency-modulated as an active power reducible value at the grid connection point.

In an embodiment, the calculation unit for calculating the power increasable value at the grid connection point is also configured to take, in a case that the active power increasable value at the grid connection point is greater than the maximum increasable power limit, the maximum increasable power limit as the active power increasable value at the grid connection point.

In an embodiment, the calculation unit for calculating the power reducible value at the grid connection point is also configured to take, in a case that the active power reducible value at the grid connection point is smaller than the maximum reducible power limit, the maximum reducible power limit as the active power reducible value at the grid connection point.

A calculation module for calculating a single-unit adjustment ratio 342 is configured to calculate, based on the total active power increment value at the grid connection point and the active power adjustable value at the grid connection point, an active power adjustment ratio of each of the photovoltaic inverters to be frequency-modulated. The active power adjustment ratio of each of the photovoltaic inverters includes an increasable power adjustment ratio or a reducible power adjustment ratio.

In an embodiment, a calculation unit for calculating the single-unit increasable adjustment ratio is configured to, in a case that the total active power increment value at the grid connection point is greater than zero, take a ratio of the total active power increment value at the grid connection point to the active power increasable value as the increasable power adjustment ratio of each of the photovoltaic inverters to be frequency-modulated; and in a case that the increasable power adjustment ratio is greater than 100%, set the increasable power adjustment ratio to be 1.

In an embodiment, a calculation unit for calculating the single-unit reducible adjustment ratio is configured to, in a case that the total active power increment value at the grid connection point is smaller than zero, take a ratio of the total active power increment value at the grid connection point to the active power reducible value as the reducible power adjustment ratio of each of the photovoltaic inverters to be frequency-modulated; and in a case that the reducible power adjustment ratio is smaller than or equal to 100%, set the reducible power adjustment ratio to be −1.

A calculation module for calculating a single-unit active increment value 343 is configured to calculate, based on the active power adjustment ratio and the active power value of each of the photovoltaic inverters to be frequency-modulated, an output power target value of each of the photovoltaic inverters to be frequency-modulated.

In an embodiment, a calculation module for calculating a single-unit increasable power increment value is configured to use the expression (9) to calculate an increasable output power increment value of a present photovoltaic inverter to be frequency-modulated:

$$\text{Command}P_n = (\text{ModelMachineMeasP}[n] \text{MeasP}_n) *\sigma_1\% + \text{Command}P_{n0} \quad (9)$$

where, $\text{Command}P_n$ is an increasable output power target value of the photovoltaic inverter to be frequency-modulated, $\text{ModelMachineMeasP}[n]$ is an active power value of a sample machine corresponding to the photovoltaic inverter to be frequency-modulated, $\text{MeasP}_n$ is an active power value of the photovoltaic inverter to be frequency-modulated, $\sigma_1\%$ is a preset increasable power ratio, and $\text{Command}P_{n0}$ is an active power value of the photovoltaic inverter to be frequency-modulated before the primary frequency modulation is performed.

In an embodiment, a calculation module for calculating a single-unit reducible power increment value is configured to use the expression (10) to calculate a reducible output power increment value of the present photovoltaic inverter to be frequency-modulated:

$$\text{Command}P_n = (\text{MeasP}[n] - n\% P_n) * \sigma_2\% \text{ Command}P_{n0} \quad (10)$$

where, $\text{Command}P_n$ is a reducible output power target value of the photovoltaic inverter to be frequency-modulated, $\text{MeasP}_n$ is the active power value of the photovoltaic inverter to be frequency-modulated, $n\% P_n$ is a minimum active power limit value, $P_n$ is the rated power of the photovoltaic power plant, $\sigma_2\%$ is a preset reducible power ratio, and $\text{Command}P_{n0}$ is the active power value of the photovoltaic inverter to be frequency-modulated before the primary frequency modulation is performed.

A determination module for determining single-unit power allocation is configured to, in a case that it is determined that the sample machines are in the normal operating state, the power limited inverters are in the normal operating state, and the total active power increment value at the grid connection point is greater than or equal to the active power lower threshold at the grid connection point, take the power limited inverters other than the sample machines in the photovoltaic power station as the photovoltaic inverters to be frequency-modulated.

As an example, in order to ensure the operation stability of the photovoltaic power plant, the minimum output limit value of the photovoltaic power plant is prevented from being set to 10% $P_n$; the photovoltaic power plant is prevented from being disconnected from the power grid due to the adjustment in the frequency modulation process; and in a case that the active power increment value of the entire photovoltaic power plant, that is, the active power increment value at the grid connection point is lower than the active power lower threshold at the grid connection point, single-unit power allocation is not performed.

In an embodiment, the single-unit frequency modulation module 122 may include a single-unit communication interface and a photovoltaic controller, wherein the single-unit communication interface is connected to the field level controller 121, and is configured to receive the single-unit primary frequency modulation command generated by the field level controller 121, and send the received single-unit primary frequency modulation command to a corresponding photovoltaic inverter to be frequency-modulated; and the photovoltaic controller is connected to the corresponding photovoltaic array 111, and is configured to adjust, based on an output power target value, a preset power adjustment step size and an adjustment rate in the single-unit primary frequency modulation command, the output active power of the photovoltaic inverter to be frequency-modulated to the output power target value according to the preset power adjustment step size and the adjustment rate.

As an example, in a case that the total active power increment value at the grid connection point is greater than 10% of the rated power of the entire plant, the active power value is increased by a step size of 10% Pn/s, and in a case that an active power command value is smaller than 10% $P_n$, the active power increment value is issued according to a control strategy period value, wherein $P_n$ is the rated power of the photovoltaic power plant.

In the embodiment of the present application, the active power control system employs a centralized control manner to acquire voltage and current signals at the grid connection point, and calculate the frequency, active power and reactive power of the power grid in real time. The active power control system is able to communicate with each of the photovoltaic inverters through optical fibers, to obtain the operating state of each of the photovoltaic inverters in real time. In a case that the frequency offset of the power grid triggers the primary frequency modulation, the active power control system proportionally adjusts, according to the operating state of each of the photovoltaic inverters, the active power value of each of the photovoltaic inverters to be frequency-modulated according to the requirements of the primary frequency modulation, thus realizing the active power allocation of the entire plant. The primary frequency modulation motions of the photovoltaic inverters to be frequency-modulated are consistent during the whole primary frequency modulation process, and the control of the entire plant is fast and has a high accuracy.

Figure 8:
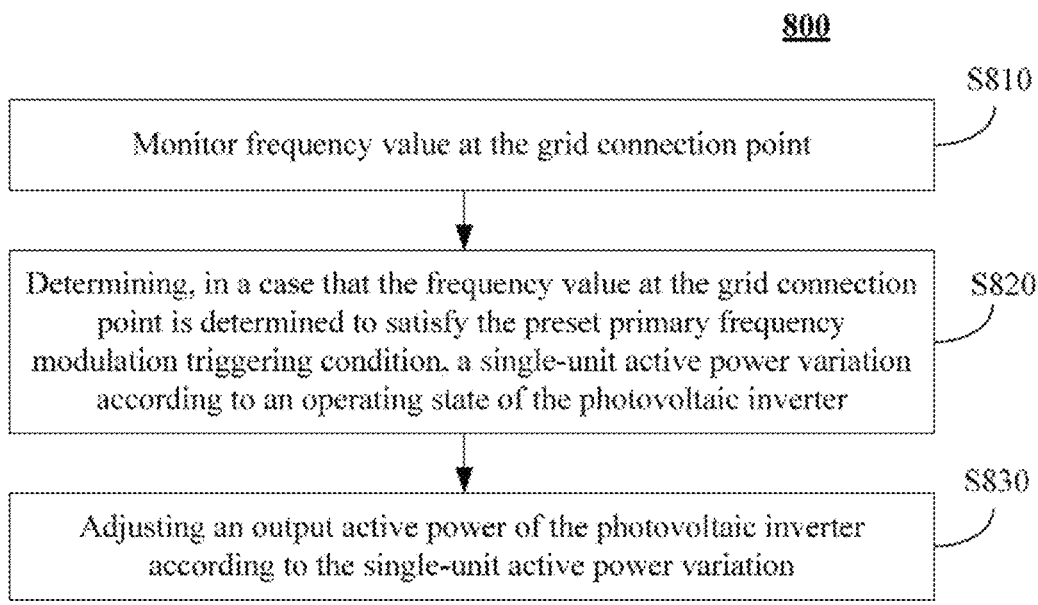
FIG. 8 is a specific flow chart showing a primary frequency modulation control method according to an embodiment of the present application.

A primary frequency modulation control method according to an embodiment of the present application will be described in detail hereinafter with reference to the drawings. FIG. 8 is a specific flow chart of a primary frequency modulation control method according to an embodiment of the present application. As shown in FIG. 8, in an embodiment, the primary frequency modulation control method 800 may include:

step S810, monitoring a frequency value at a grid connection point;

step S820, determining, in a case that the frequency value at the grid connection point is determined to satisfy a preset primary frequency modulation triggering condition, a single-unit active power variation according to an operating state of each of the photovoltaic inverters; and step S830, adjusting an output active power of each of the photovoltaic inverters according to the single-unit active power variation.

The primary frequency modulation control method according to the embodiment of the present application is able to improve a response speed and accuracy of primary frequency modulation of a generator set of a photovoltaic power plant, and allow motions of generator sets to be consistent, thus an electric power system has high stability.

In an embodiment, in the step S820, the step of determining the single-unit active power variation according to the operating state of each of the photovoltaic inverters may specifically include:

step S821, determining a total active power control target value at the grid connection point, and calculating a total active power variation at the grid connection point according to the total active power control target value.

In an embodiment, step S821 may specifically include:

step S821-01, determining, in a case that a frequency offset at the grid connection point satisfies a primary frequency modulation triggering condition, the total active power control target value at the grid connection point according to an active power initial value of the photovoltaic power plant, a frequency value at the grid connection point and an AGC command value.

Specifically, in the step S821-01, the step of determining the total active power control target value at the grid connection point may specifically include:

step S01, calculating the frequency offset at the grid connection point according to the detected frequency value at the grid connection point, and calculating an active power increment value of the frequency offset at the grid connection point according to the frequency offset at the grid connection point.

In an embodiment, in the step S01, the step of calculating the active power increment value of the frequency offset at the grid connection point may specifically include:

taking, in a case that the frequency value at the grid connection point is greater than or equal to a minimum frequency value of a fast frequency response and the frequency value at the grid connection point is smaller than a negative threshold of the fast frequency response, a difference between the negative threshold of the fast frequency response and the frequency value at the grid connection point as the frequency offset at the grid connection point;

taking, in a case that the frequency value at the grid connection point is greater than a positive threshold of the fast frequency response and smaller than or equal to a maximum frequency value of the fast frequency response, a difference between the positive threshold of the fast frequency response and the frequency value at the grid connection point as the frequency offset at the grid connection point;

taking, in a case that the frequency value at the grid connection point is smaller than the minimum frequency value of the fast frequency response, a difference between the negative threshold of the fast frequency response and the minimum frequency value of the fast frequency response as the frequency offset at the grid connection point; and taking, in a case that the frequency value at the grid connection point is greater than the maximum frequency value of the fast frequency response, a difference between the positive threshold of the fast frequency response and the maximum frequency value of the fast frequency response as the frequency offset at the grid connection point.

In this embodiment, the negative threshold of the fast frequency response is a sum of a fundamental frequency value and a negative dead band threshold, and the maximum frequency value of the fast frequency response is a sum of the fundamental frequency value and a positive dead band threshold.

Step S02, taking, according to a current AGC command value and a previous AGC command value of a power grid, a difference between the current AGC command value and the previous AGC command value as an active power increment value of the current AGC command.

step S803, setting, in a case that a first active increment control condition is satisfied, the total active power control target value at the grid connection point to be an algebraic sum of adding the active power increment value of the current AGC command and the active power increment value of the frequency offset to the active power initial value, to obtain an active total active power increment value at the grid connection point.

In an embodiment, the first active increment control condition includes any one of the following conditions:

the frequency value at the grid connection point is within an allowable variation range of the frequency at the grid connection point; the frequency value at the grid connection point exceeds the allowable variation range of the frequency at the grid connection point and an adjustment direction of the current AGC command value is the same as an adjustment direction of the active power increment value of the frequency offset.

In an embodiment, the adjustment directions are the same indicates that both the active power increment value of the current AGC command value and the active power increment value of the frequency offset are positive or negative, and the adjustment directions are different indicates that the active power increment value of the AGC command and the active power increment value of the frequency offset are not positive at the same time or negative at the same time.

Step S04, in a case that a second active increment control condition is satisfied, keeping the AGC command value of the power grid to be the previous AGC command value, and adding the active power increment value of the frequency offset to the active power initial value, to obtain the active total active power increment value at the grid connection point.

In an embodiment, the second active increment control condition includes: the frequency value at the grid connection point exceeds the allowable variation range of the frequency at the grid connection point, and the adjustment direction of the current ACG command value is different from the adjustment direction of the active power increment value of the frequency offset.

Step S05, setting, in a case that a third active increment control condition is satisfied, the total active power control target value at the grid connection point to be the current AGC command value.

The third active increment control condition includes: the frequency offset at the grid connection point is greater than the negative dead band threshold and is smaller than the positive dead band threshold.

Step S821-02, setting, in a case that an active power control target value at the grid connection point is lower than a preset active power lower threshold at the grid connection point, the active power control target value at the grid connection point to be the active power lower threshold at the grid connection point.

Step S821-03, taking a difference between the total active power control target value and the active power initial value of the photovoltaic power plant as the total active power increment value at the grid connection point.

Step S822, determining, based on the operating state of each of the photovoltaic inverters and a single-unit active power allocation condition in the photovoltaic power station, photovoltaic inverters to be frequency-modulated that are allowed to participate in primary frequency modulation of the photovoltaic power station.

In the embodiment of the present application, the photovoltaic inverters of the photovoltaic power station include power limited inverters and sample machines corresponding to the power limited inverters.

In this step, in the step S822, the step of determining the photovoltaic inverters to be frequency-modulated that are allowed to participate in primary frequency modulation of the photovoltaic power station may specifically include:

step S822-01, determining, in a case that the sample machines satisfy a preset fault-free operating condition, that the sample machines are in a normal operating state;

step S822-02, determining, in a case that the power limited inverters satisfy the preset fault-free operating condition and the sample machines corresponding to the power limited inverters satisfy the preset fault-free operating condition at the same time, that the power limited inverters are in a normal operating state.

In this step, the fault-free operating condition includes that, in a case that each of the sample machines or each of the power limited inverters is taken as a component to be determined, the component to be determined satisfies the following conditions:

a communication interface of the component to be determined is normal, the component to be determined has no fault alarm, a measured active power of the component to be determined is greater than or equal to the preset active power lower threshold at the grid connection point, and an active power variation rate of the component to be determined is smaller than an active power variation rate threshold.

In an embodiment, the sample machines are configured to operate according to a rated power of the photovoltaic inverter, and a sample machine corresponding to each of the power limited inverters is selected according to preset sample machine selection steps, and the sample machine selection steps include:

S01, obtaining multiple groupings of multiple photovoltaic inverters, and screening out photovoltaic inverters having similar geographical locations and a same output capacity from the photovoltaic inverters in each of the groupings; and S02, selecting a photovoltaic inverter from the photovoltaic inverters obtained by screening to be the sample machine, and taking the photovoltaic inverters other than the sample machine in the grouping as the power limited inverters.

Step S822-03, taking, in a case that it is determined that the sample machines are in the normal operating state, the power limited inverters are in the normal operating state, and the total active power increment value at the grid connection point is greater than or equal to the active power lower threshold at the grid connection point, the power limited inverters other than the sample machines in the photovoltaic power station as the photovoltaic inverters to be frequency-modulated.

Step S823, allocating the total active power increment value according to the operating state of each of the photovoltaic inverters to be frequency-modulated, to obtain an output power target value of each of the photovoltaic inverters to be frequency-modulated, and sending a single-unit frequency modulation command including the output power target value, a preset power adjustment step size and an adjustment rate to the photovoltaic inverter to be frequency-modulated.

In the embodiment of the present application, the sample machines are configured to operate according to the rated power of the photovoltaic inverter, and the sample machine corresponding to each of the power limited inverters is selected according to preset sample machine selection steps, and the sample machine selection steps include:

obtaining multiple groupings of multiple photovoltaic inverters, and screening out photovoltaic inverters having similar geographical locations and the same output capacity from the photovoltaic inverters in each of the groupings; and selecting a photovoltaic inverter from the photovoltaic inverters obtained by screening to be the sample machine, and taking the photovoltaic inverters other than the sample machine in the grouping as the power limited inverters.

In an embodiment, in the step S823, the step of allocating the total active power increment value according to the operating state of each of the photovoltaic inverters to be frequency-modulated, to obtain the output power target value of each of the photovoltaic inverters to be frequency-modulated may specifically include:

step S823, allocating the total active power increment value according to the operating state of each of the photovoltaic inverters to be frequency-modulated, to obtain the output power target value of each of the photovoltaic inverters to be frequency-modulated includes:

step S823-01, calculating, according to the total active power increment value at the grid connection point and an acquired active power value of each of the photovoltaic inverters to be frequency-modulated, an active power adjustable value at the grid connection point, and the active power adjustable value at the grid connection point includes an active power increasable value at the grid connection point or an active power reducible value at the grid connection point.

In an embodiment, the step S823-01 may include:

taking, in a case that the total active power increment value at the grid connection point is greater than zero and greater than a preset maximum increasable power limit, a difference between an active power value of the sample machine corresponding to each of the photovoltaic inverters to be frequency-modulated and an active power value of a present photovoltaic inverter to be frequency-modulated as an increasable power value of the photovoltaic inverter to be frequency-modulated, and taking a sum of increasable power values of the photovoltaic inverters to be frequency-modulated as an active power increasable value at the grid connection point; and taking, in a case that the total active power increment value at the grid connection point is smaller than zero and smaller than a preset maximum reducible power limit, a difference between the active power value of each of the photovoltaic inverters to be frequency-modulated and the active power lower threshold at the grid connection point as a reducible power value of each of the photovoltaic inverters to be frequency-modulated, and taking a sum of reducible power values of the photovoltaic inverters to be frequency-modulated as an active power reducible value at the grid connection point.

In an embodiment, the step S823-01 may further include:
taking, in a case that the active power increasable value at the grid connection point is greater than the maximum increasable power limit, the maximum increasable power limit as the active power increasable value at the grid connection point; and
taking, in a case that the active power reducible value at the grid connection point is smaller than the maximum reducible power limit, the maximum reducible power limit as the active power reducible value at the grid connection point.

Step S823-02, calculating, based on the total active power increment value at the grid connection point and the active power adjustable value at the grid connection point, an active power adjustment ratio of each of the photovoltaic inverters to be frequency-modulated, and the active power adjustment ratio of each of the photovoltaic inverters includes an increasable power adjustment ratio or a reducible power adjustment ratio.

In an embodiment, the step S823-02 may specifically include:
taking, in a case that the total active power increment value at the grid connection point is greater than zero, a ratio of the total active power increment value at the grid connection point to the active power increasable value as the increasable power adjustment ratio of each of the photovoltaic inverters to be frequency-modulated; and setting, in a case that the increasable power adjustment ratio is greater than 100%, the increasable power adjustment ratio to be 1; and
taking, in a case that the total active power increment value at the grid connection point is smaller than zero, a ratio of the total active power increment value at the grid connection point to the active power reducible value as the reducible power adjustment ratio of each of the photovoltaic inverters to be frequency-modulated; and setting, in a case that the reducible power adjustment ratio is smaller than or equal to 100%, the reducible power adjustment ratio to be −1.

Step S823-03, calculating, based on the active power adjustment ratio and the active power value of each of the photovoltaic inverters to be frequency-modulated, an output power target value of each of the photovoltaic inverters to be frequency-modulated.

As an example, an increasable output power increment value of a present photovoltaic inverter to be frequency-modulated is calculated by using the expression:

$$CommandP_n=(ModelMachineMeasP[n]-MeasP_n)*\sigma_1\%+CommandP_{n0}$$

where, $CommandP_n$ is an increasable output power target value of the photovoltaic inverter to be frequency-modulated, $ModelMachineMeasP[n]$ is an active power value of a sample machine corresponding to the photovoltaic inverter to be frequency-modulated, $MeasP_n$ is an active power value of the photovoltaic inverter to be frequency-modulated, $\sigma_1\%$ is a preset increasable power ratio, and $CommandP_{n0}$ is an active power value of the photovoltaic inverter to be frequency-modulated before the primary frequency modulation is performed.

As an example, a reducible output power increment value of the present photovoltaic inverter to be frequency-modulated is calculated by using the expression:

$$CommandP_n=(MeasP[n]-n\%\ P_n)*\sigma_2\%+CommandP_{n0}$$

where, $CommandP_n$ is a reducible output power target value of the photovoltaic inverter to be frequency-modulated, $MeasP_n$ is the active power value of the photovoltaic inverter to be frequency-modulated, $n\%\ P_n$ is a minimum active power limit value, $P_n$ is the rated power of the photovoltaic power plant, $\sigma_2\%$ is a preset reducible power ratio, and $CommandP_{n0}$ is the active power value of the photovoltaic inverter to be frequency-modulated before the primary frequency modulation is performed.

In an embodiment, the primary frequency modulation control method 800 may further include:
S840, receiving a single-unit primary frequency modulation command, and sending the received single-unit primary frequency modulation command to the corresponding photovoltaic inverter to-be frequency-modulated;
S850, adjusting, based on an output power target value, a preset power adjustment step size and an adjustment rate in the single-unit primary frequency modulation command, the output active power of the photovoltaic inverter to be frequency-modulated to the output power target value according to the preset power adjustment step size and the adjustment rate.

Other details of the single-unit primary frequency modulation according to the embodiment of the present application are similar to a process of the primary frequency modulation performed by the active power control system of the photovoltaic power plant according to the embodiment of the present application described above in conjunction with FIGS. 1 to 8, which will not be described herein.

A test scheme and technical effects of the method of using the active power control system to perform the primary frequency modulation of the photovoltaic power plant according to the embodiment of the present application will be described hereinafter in exemplary embodiments.

Figure 9:
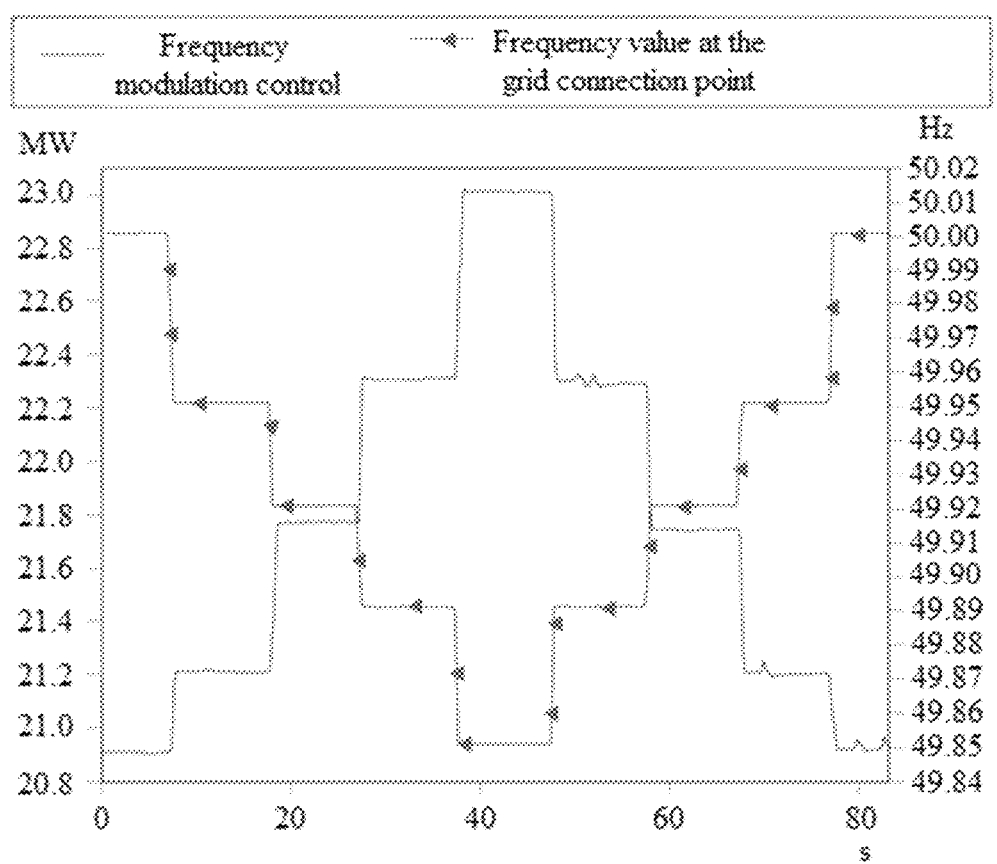
FIG. 9 is a curve diagram schematically showing that an output power responds to frequency fluctuation at a grid connection point in a case that frequency offset occurs at the grid connection point.

FIG. 9 is a curve diagram schematically showing that an output power responds to frequency fluctuation at a grid connection point in a case that frequency offset occurs at the grid connection point.

In this embodiment, a rated power of a photovoltaic power station is 30 MW, and the photovoltaic power station may employ a first photovoltaic inverter and a second photovoltaic inverter of two different models. A rated power of the first photovoltaic inverter is 10 MW, a rated power of the second photovoltaic inverter is 20 MW, and a fundamental frequency of the photovoltaic power plant is 50 Hz.

As shown in FIG. 9, in a case that a frequency value at the grid connection point exceeds the fluctuation of a frequency dead band, a primary frequency modulation motion of an active power is performed according to an active power/frequency characteristic curve. In this embodiment, a grid connection point simulation device is employed to simulate the frequency fluctuation at the grid connection point. It can be seen from FIG. 9 that, a continuous step change of the frequency occurs as follows: 50 Hz→49.95 Hz→49.92 Hz→29.89 Hz→49.85 H→49.89 Hz→49.92 Hz→49.95 Hz→50 Hz. As a result of the test, during the change of the frequency at the grid connection point, the response of the active power of the entire photovoltaic power plant is completed within 500 ms.

In an embodiment, a frequency disturbance test is performed on the power grid frequency by allowing multiple inverters of a designated photovoltaic power plant to perform rapid load increasing, rapid load reduction and jumping of the inverter power.

Specifically, table 1 shows set values in a frequency rapid increasing and reduction test in the frequency disturbance test, and table 2 shows set values in a frequency jumping test in the frequency disturbance test.

TABLE 1

Set values in the frequency rapid increasing and reduction test

| Name of set value | Value (Low frequency/ Over frequency) | Unit |
|---|---|---|
| Dead band | −0.05/0.05 | Hz |
| Droop coefficient | 0.667/0.667 | None |
| Cutoff frequency | 49.8/50.2 | Hz |

TABLE 2

Set values in the frequency jumping test

| Name of set value | Value (Low frequency/ Over frequency) | Unit |
|---|---|---|
| Dead band | −0.05/0.05 | Hz |
| Droop coefficient | 1/1 | None |
| Cutoff frequency | 49.85/50.15 | Hz |

Figure 10:
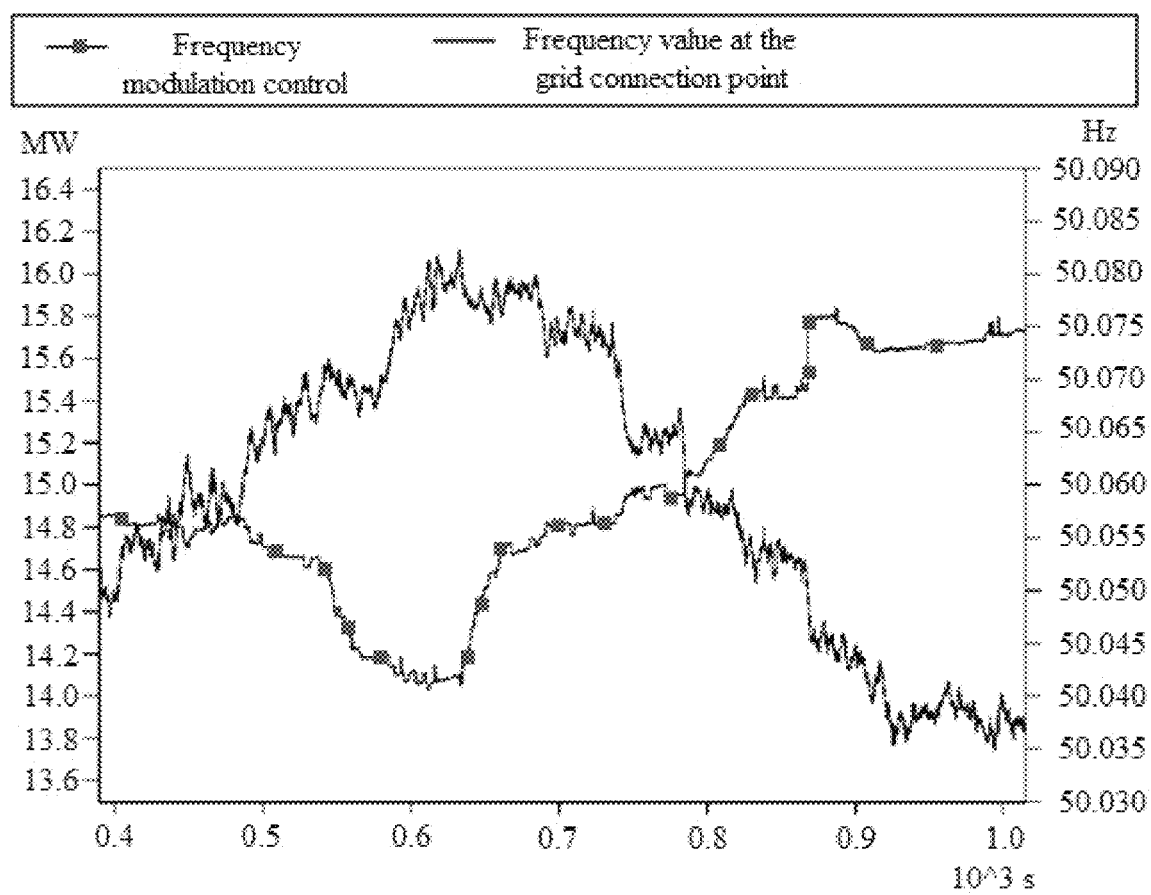
FIG. 10 is an oscillogram showing a frequency fast response of a photovoltaic power plant in which a frequency increases and decreases rapidly in a frequency disturbance test according to the embodiment of the present application.
Figure 11:
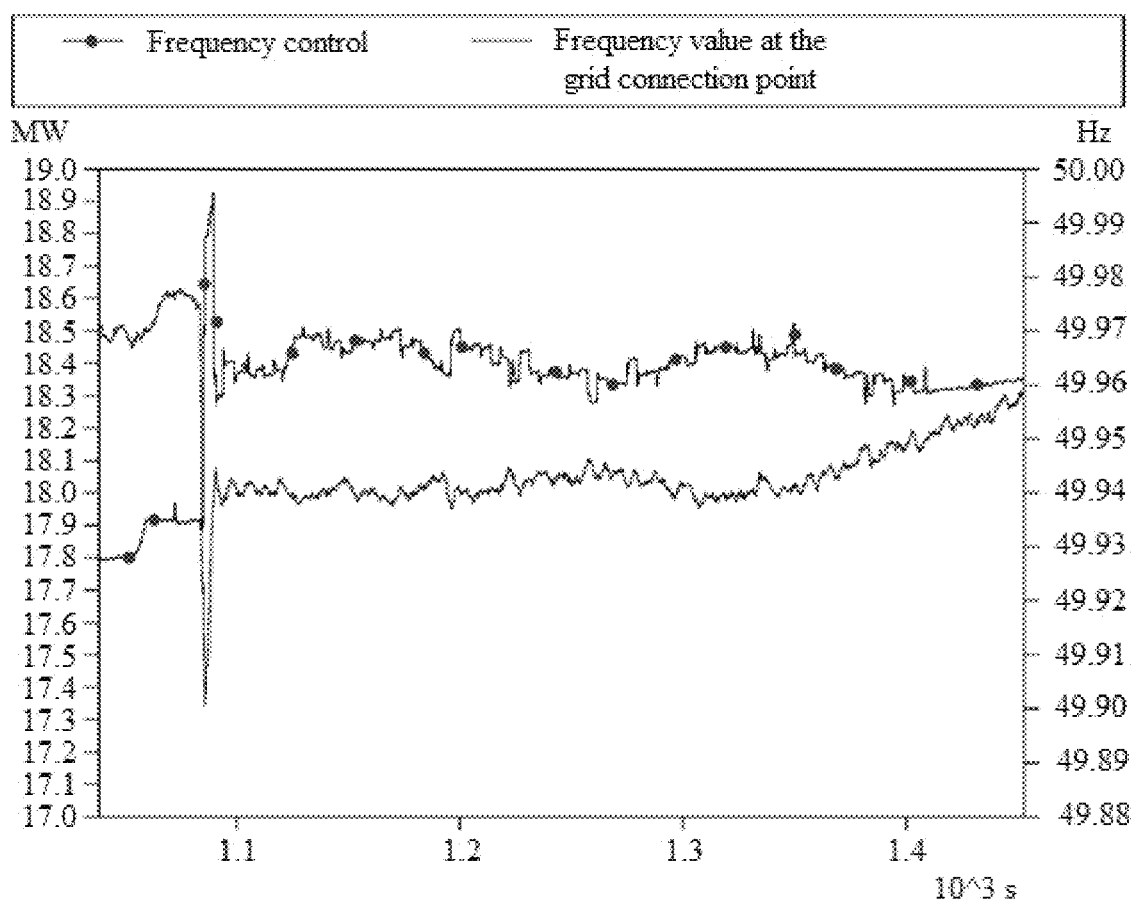
FIG. 11 is an oscillogram showing a frequency fast response of the photovoltaic power plant in which the frequency jumps in the frequency disturbance test according to the embodiment of the present application.

FIG. 10 is an oscillogram showing a frequency fast response of the photovoltaic power plant in which the frequency increases and decreases rapidly in the frequency disturbance test according to the embodiment of the present application; and FIG. 11 is an oscillogram showing the frequency fast response of the photovoltaic power plant in which the frequency jumps in the frequency disturbance test according to the embodiment of the present application.

As shown in FIG. 10, during a specified test period, a maximum frequency disturbance is about 50.08 Hz; the power limit command of the entire plant is 2200 kW, and a gold wind power at the actual grid connection point is about 10 MW. The power value of the photovoltaic power plant responds rapidly according to the rapid increasing and reduction of the frequency.

As shown in FIG. 11, during a specified test period, a maximum frequency disturbance is about 49.91 Hz; the power limit command of the entire plant is 2200 kW, and the gold wind power at the actual grid connection point is about 12 MW. The power value of the photovoltaic power plant responds rapidly according to the frequency jumping.

It can be obtained from the above frequency test of the photovoltaic power plant and the frequency test result of the entire actual photovoltaic power plant that, a photovoltaic inverter unit of the photovoltaic power plant can better track the frequency disturbance in a situation that the power is limited, and an active power response time of the entire plant is less than 500 ms, which effectively improves the response speed and accuracy of the primary frequency modulation of generator sets of the photovoltaic power plant, thus motions of the generator sets are consistent, and the electric power system has high stability.

The above embodiments may be implemented entirely or partially by software, hardware, firmware or any combination thereof. In a case that the software is employed, it may be implemented entirely or partially in the form of a computer program product or a computer readable storage medium. The computer program product or the computer readable storage medium includes one or more computer instructions. When the computer program instructions are loaded and executed on a computer, the processes or functions according to the embodiments of the present application are generated entirely or partially. The computer may be a general purpose computer, a special purpose computer, a computer network, or other programmable device. The computer instructions may be stored in the computer readable storage medium or transmitted from one computer readable storage medium to another computer readable storage medium, for example, the computer instructions may be transmitted from a website, computer, server or data center to another website, computer, server, or data center by wire (e.g., coaxial cable, fiber optic, digital subscriber line (DSL), or wireless (e.g., infrared, wireless, microwave, etc.). The computer readable storage medium may be any available medium that can be accessed by a computer or a data storage device such as a server, data center, or the like that includes one or more available media. The available medium may be a magnetic medium (such as a floppy disk, a hard disk, a magnetic tape), an optical medium (such as a DVD), or a semiconductor medium (such as a Solid State Disk (SSD)) and the like.

It is to be clarified that, the present application is not limited to the specific configurations and processes described above and illustrated in the drawings. For the sake of brevity, a detailed description of known methods is omitted herein. In the above embodiments, several specific steps are described and illustrated as examples. However, the method and process of the present application is not limited to the specific steps described and illustrated. After understanding the spirit of the present application, those skilled in the art can make various changes, modifications and additions, or change the order between the steps.

The above descriptions are only specific embodiments of the present application, and those skilled in the art can clearly understand that, for the convenience and brevity of the description, the specific working processes of the system, module and unit described above may refer to the corresponding process in the embodiments of the method described hereinbefore, which will not be repeated herein. It should be understood that, the scope of protection of the present application is not limited to this, various equivalent modifications or substitutions may be easily conceived by those skilled in the art within the technical scope of the present application, and these modifications or substitutions are intended to be fallen into the scope of the protection of the present application.

The invention claimed is:

1. A photovoltaic power plant, comprising a photovoltaic power station and an active power control system, wherein the photovoltaic power station comprises a plurality of photovoltaic arrays and a plurality of photovoltaic inverters, and the photovoltaic inverters are configured to convert direct current electrical energy generated by the photovoltaic arrays to alternating current electrical energy; and the active power control system is configured to determine, in a case that a frequency value at a grid connection point of the photovoltaic power plant satisfies a preset primary frequency modulation triggering condition, a single-unit active power variation according to an operating state of each of the photovoltaic inverters, to adjust an output active power of each of the photovoltaic inverters;

the active power control system comprises a field level controller and a plurality of single-unit frequency modulation modules, wherein the field level controller is configured to, in a case that the frequency value at the grid connection point is determined to meet the primary frequency modulation triggering condition, calculate a total active power increment value at the grid connection point based on the frequency value at the grid connection point, and generate a single-unit primary frequency modulation command according to the operating state of each of the photovoltaic inverters; and each of the single-unit frequency modulation modules is connected to a corresponding photovoltaic inverter, and each of the single-unit frequency modulation modules is configured to adjust an output active power of the corresponding photovoltaic inverter according to the single-unit primary frequency modulation command, wherein the single-unit primary frequency modulation command includes an output power target value of each of the photovoltaic inverters, a preset power adjustment step size of each of the photovoltaic inverters and an adjustment rate of each of the photovoltaic inverters.

2. The photovoltaic power plant according to claim 1, wherein each of the single-unit frequency modulation modules comprises:

a single-unit communication interface connected to the field level controller, wherein the single-unit communication interface is configured to receive the single-unit primary frequency modulation command generated by the field level controller, and send the received single-unit primary frequency modulation command to a corresponding photovoltaic inverter to be frequency-modulated; and a photovoltaic controller, which is configured to adjust, based on the output power target value, the preset power adjustment step size and the adjustment rate included in the single-unit primary frequency modulation command, the output active power of the photovoltaic inverter to be frequency-modulated to the output power target value according to the preset power adjustment step size and the adjustment rate.

3. The photovoltaic power plant according to claim 2, wherein the field level controller comprises:

a primary frequency modulation triggering device of the photovoltaic power plant, which is configured to monitor the frequency value at the grid connection point, and adjust, in a case that the monitored frequency value at the grid connection point is offset from a preset fundamental frequency value and a frequency offset satisfies the primary frequency modulation triggering condition, the output active power of each of the photovoltaic inverters; the primary frequency modulation triggering condition comprises that the frequency value at the grid connection point is greater than a preset positive dead band threshold, or the frequency value at the grid connection point is smaller than a preset negative dead band threshold;

a determination device for determining the total active power increment value, which is configured to determine, in a case that the frequency offset satisfies the primary frequency modulation triggering condition, a total active power control target value at the grid connection point, and calculate the total active power increment value at the grid connection point according to the total active power control target value;

a single-unit primary frequency modulation triggering device, which is configured to determine, based on the operating state of each of the photovoltaic inverters and a single-unit active power allocation condition in the photovoltaic power station, photovoltaic inverters to be frequency-modulated that are allowed to participate in primary frequency modulation of the photovoltaic power station; and a single-unit active power allocation device is configured to allocate the total active power increment value according to the operating state of each of the photovoltaic inverters to be frequency-modulated, to obtain the output power target value of each of the photovoltaic inverters to be frequency-modulated; and send a single-unit primary frequency modulation command comprising the output power target value of each of the photovoltaic inverters, the preset power adjustment step size of each of the photovoltaic inverters and the adjustment rate of each of the photovoltaic inverters to each of the photovoltaic inverters to be frequency-modulated.

4. The photovoltaic power plant according to claim 3, wherein the determination device for determining the total active power increment value comprises:

a determination module for determining the total active power control target value, which is configured to determine, in a case that the frequency offset at the grid connection point satisfies the primary frequency modulation triggering condition, the total active power control target value at, the grid connection point according to an active power initial value of the photovoltaic power plant, the frequency value at the grid connection point, and an Automatic Generation Control (AGC) command value;

a setting module for setting a total active power target limit value, which is configured to set, in a case that an active power control target value at the grid connection point is lower than a preset active power lower threshold at the grid connection point, the active power control target value at the grid connection point to be the active power lower threshold at the grid connection point; and a calculation module for calculating the total active power increment value, which is configured to take a difference between the total active power control target value and the active power initial value of the photovoltaic power plant as the total active power increment value at the grid connection point.

5. The photovoltaic power plant according to claim 4, wherein the determination module for determining the total active power increment value comprises:

a calculation unit for calculating a primary frequency modulation active increment value, which is configured to calculate the frequency offset at the grid connection point according to the detected frequency value at the grid connection point, and calculate an active power increment value of the frequency offset at, the grid connection point according to the frequency offset at the grid connection point;

a calculation unit for calculating an AGC command active increment value, which is configured to take a difference between a current AGC command value and a previous AGC command value to be an active power increment value of the current AGC command;

a calculation unit for calculating a first total control target value, which is configured to set, in a case that a first active increment control condition is satisfied, the total active power control target value at the grid connection point to be an algebraic sum of adding the active power increment value of the current AGC command and the active power increment value of the frequency offset to the active power initial value, to obtain an active total active power increment value at the grid connection point;

a calculation unit for calculating a second total control target value, which is configured to, in a case that a second active increment control condition is satisfied, keep the AGC command value of a power grid to be the previous AGC command value, and add the active power increment value of the frequency offset to the active power initial value, to obtain the active total active power increment value at the grid connection point; and a calculation unit for calculating a third total control target value, which is configured to set, in a case that a third active increment control condition is satisfied, the total active power control target value at the grid connection point to be the current AGC command value.

6. The photovoltaic power plant according to claim 3, wherein the photovoltaic inverters comprise power limited inverters, and the photovoltaic arrays comprise sample machines corresponding to the power limited inverters;

the single-unit primary frequency modulation triggering device comprises:

a determination module for determining a sample machine state, which is configured to determine, in a case that the sample machines satisfy a preset fault-free operating condition, that the sample machines are in a normal operating state;

a determination module for determining a power limited inverter state, which is configured to determine, in a case that the power limited inverters satisfy the preset fault-free operating condition and the sample machines corresponding to the power limited inverters satisfy the preset fault-free operating condition at the same time, that the power limited inverters are in a normal operating state;

a determination module for determining single-unit power allocation, which is configured to, in a case that it is determined that the sample machines are in the normal operating state, the power limited inverters are in the normal operating state, and the total active power increment value at the grid connection point is greater than or equal to the active power lower threshold at the grid connection point, take the power limited inverters other than the sample machines in the photovoltaic power station as the photovoltaic inverters to be frequency-modulated.

7. The photovoltaic power plant according to claim 6, wherein the sample machines are configured to operate according to a rated power of the photovoltaic inverter, and a sample machine corresponding to each of the power limited inverters is selected according to preset sample machine selection steps, and the sample machine selection steps comprises:

a plurality of groupings of the photovoltaic inverters are obtained, and photovoltaic inverters having similar geographical locations and same output capacities are screened out of the photovoltaic inverters in each of the groupings; and a photovoltaic inverter is selected from the photovoltaic inverters obtained by screening to be the sample machine, and the photovoltaic inverters other than the sample machine in the grouping are taken as the power limited inverters.

8. The photovoltaic power plant according to claim 3, wherein the single-unit active power allocation device comprises:

a calculation module for calculating a power adjustable value at the grid connection point, which is configured to calculate, according to the total active power increment value at the grid connection point and an acquired active power value of each of the photovoltaic inverters to be frequency-modulated, an active power adjustable value at the grid connection point, and the active power adjustable value at the grid connection point comprises an active power increasable value at the grid connection point or an active power reducible value at the grid connection point;

a calculation module for calculating a single-unit adjustment ratio, which is configured to calculate, based on the total active power increment value at the grid connection point and the active power adjustable value at the grid connection point, an active power adjustment ratio of each of the photovoltaic inverters to be frequency-modulated, and the active power adjustment ratio of each of the photovoltaic inverters comprises an increasable power adjustment ratio or a reducible power adjustment ratio; and a calculation module for calculating a single-unit active increment value, which is configured to calculate, based on the active power adjustment ratio and the active power value of each of the photovoltaic inverters to be frequency-modulated, an output power target value of each of the photovoltaic inverters to be frequency-modulated.

9. The photovoltaic power plant according to claim 8, wherein the calculation module for calculating the grid connection point power adjustable value comprises:

a calculation unit for calculating a power increasable value at the grid connection point, which is configured to, in a case that the total active power increment value at the grid connection point is greater than zero and greater than a preset maximum increasable power limit, take a difference between an active power value of the sample machine corresponding to each of the photovoltaic inverters to be frequency-modulated and an active power value of a present photovoltaic inverter to be frequency-modulated as an increasable power value of the photovoltaic inverter to be frequency-modulated, and take a sum of increasable power values of the photovoltaic inverters to be frequency-modulated as an active power increasable value at the grid connection point; and a calculation unit for calculating a power reducible value at the grid connection point, which is configured to, in a case that the total active power increment value at the grid connection point is smaller than zero and smaller than a preset maximum reducible active power limit, take a difference between the active power value of each of the photovoltaic inverters to be frequency-modulated and the active power lower threshold at the grid connection point as a reducible power value of each of the photovoltaic inverters to be frequency-modulated, and take a sum of reducible power values of the photovoltaic inverters to be frequency-modulated as an active power reducible value at the grid connection point.

10. A primary frequency modulation control method for a photovoltaic power plant, comprising:
- monitoring a frequency value of a grid connection point of the photovoltaic power plant;
- determining, in a case that the frequency value at the grid connection point is determined to satisfy a preset primary frequency modulation triggering condition, a single-unit active power variation according to an operating state of each of photovoltaic inverters; and
- adjusting an output active power of each of the photovoltaic inverters according to the single-unit active power variation by sending a single-unit frequency modulation command comprising an output power target value, a preset power adjustment step size and an adjustment rate to each of the photovoltaic inverters to be frequency-modulated.

11. The primary frequency modulation control method according to claim 10, wherein determining the single-unit active power variation according to the operating state of each of the photovoltaic inverters comprises:
- determining a total active power control target value at the grid connection point, and calculating a total active power increment value at the grid connection point according to the total active power control target value;
- determining, based on the operating state of each of the photovoltaic inverters and a single-unit active power allocation condition in the photovoltaic power station, photovoltaic inverters to be frequency-modulated that are allowed to participate in primary frequency modulation of the photovoltaic power station; and
- allocating the total active power increment value according to the operating state of each of the photovoltaic inverters to be frequency-modulated, to obtain the output power target value of each of the photovoltaic inverters to be frequency-modulated.

12. The primary frequency modulation control method according to claim 11, wherein determining the total active power control target value at the grid connection point and calculating the total active power increment value at the grid connection point according to the total active power target value comprises:
- determining, in a case that a frequency offset at the grid connection point satisfies a primary frequency modulation triggering condition, the total active power control target value at the grid connection point according to an active power initial value of the photovoltaic power plant, the frequency value at the grid connection point and an Automatic Gain Control (AGC) command value;
- setting, in a case that an active power control target value at the grid connection point is lower than a preset active power lower threshold at the grid connection point, the active power control target value at the grid connection point to be the active power lower threshold at the grid connection point; and
- taking a difference between the total active power control target value and the active power initial value of the photovoltaic power plant as the total active power increment value at the grid connection point.

13. The primary frequency modulation control method according to claim 12, wherein determining the total active power control target value at the grid connection point according to the active power initial value of the photovoltaic power plant, the frequency value at the grid connection point and the AGC command value comprises:
- calculating the frequency offset at the grid connection point according to the detected frequency value at the grid connection point, and calculating an active power increment value of the frequency offset at the grid connection point according to the frequency offset at the grid connection point;
- taking, according to a current AGC command value and a previous AGC command value of a power grid, a difference between the current AGC command value and the previous AGC command value as an active power increment value of the current AGC command;
- setting, in a case that a first active increment control condition is satisfied, the total active power control target value at the grid connection point to be an algebraic sum of adding the active power increment value of the current AGC command and the active power increment value of the frequency offset to the active power initial value, to obtain an active total active power increment value at the grid connection point;
- in a case that a second active increment control condition is satisfied, keeping the AGC command value of the power grid to be the previous AGC command value, and adding the active power increment value of the frequency offset to the active power initial value, to obtain the active total active power increment value at the grid connection point; and
- setting, in a case that a third active increment control condition is satisfied, the total active power control target value at the grid connection point to be the current AGC command value.

14. The primary frequency modulation control method according to claim 13, wherein calculating the frequency offset at the grid connection point according to the detected frequency value at the grid connection point comprises:
- taking, in a case that the frequency value at the grid connection point is greater than or equal to a minimum frequency value of a fast frequency response and the frequency value at the grid connection point is smaller than a negative threshold of the fast frequency response, a difference between the negative threshold of the fast frequency response and the frequency value at the grid connection point as the frequency offset at the grid connection point;
- taking, in a case that the frequency value at the gild connection point is greater than a positive threshold of the fast frequency response and smaller than or equal to a maximum frequency value of the fast frequency response, a difference between the positive threshold of the fast frequency response and the frequency value at the grid connection point as the frequency offset at the grid connection point;
- taking, in a case that the frequency value at the grid connection point is smaller than the minimum frequency value of the fast frequency response, a difference between the negative threshold of the fast frequency response and the minimum frequency value of the fast frequency response as the frequency offset at the grid connection point; and
- taking, in a case that the frequency value at the grid connection point is greater than maximum frequency value of the fast frequency response, a difference between the positive threshold of the fast frequency response and the maximum frequency value of the fast frequency response as the frequency offset at the grid connection point; wherein
- the negative threshold of the fast frequency response is a sum of a fundamental frequency value and a negative dead band threshold, and the maximum frequency value of the fast frequency response is a sum of the fundamental frequency value and a positive dead band threshold.

15. The primary frequency modulation control method according to claim 11, wherein the photovoltaic inverters of the photovoltaic power station comprises power limited inverters and sample machines corresponding to the power limited inverters;
   determining, based on the operating state of each of the photovoltaic inverters and a single-unit active power allocation condition in the photovoltaic power station, photovoltaic inverters to be frequency-modulated that are allowed to participate in the primary frequency modulation of the photovoltaic power station comprises:
   determining, in a case that the sample machines satisfy a preset fault-free operating condition, that the sample machines are in a normal operating state;
   determining, in a case that the power limited inverters satisfy the preset fault-free operating condition and the sample machines corresponding to the power limited inverters satisfy the preset fault-free operating condition at the same time, that the power limited inverters are in a normal operating; state;
   taking, in a case that it is determined that the sample machines are in the normal operating state, the power limited inverters are in the normal operating state, and the total active power increment value at the grid connection point is greater than or equal to the active power lower threshold at the grid connection point; the power limited inverters other than the sample machines in the photovoltaic power station as the photovoltaic inverters to be frequency-modulated.

16. The primary frequency modulation control method according to claim 15, wherein
   the fault-free operating condition comprises that, in a case that each of the sample machines or each of the power limited inverters is taken as a component to be determined, the component to be determined satisfies the following conditions:
   a communication interface of the component to be determined is normal, the component to be determined has no fault alarm, a measured active power of the component to be determined is greater than or equal to the preset active power lower threshold at the grid connection point, and an active power variation rate of the component to be determined is smaller than an active power variation rate threshold.

17. The primary frequency modulation control method according to claim 15, wherein
   the sample machines are configured to operate according to a rated power of the photovoltaic inverter, and a sample machine corresponding to each of the power limited inverters is selected according to preset sample machine selection steps, and the sample machine selection steps comprise:
   obtaining a plurality of groupings of the photovoltaic inverters, and screening out photovoltaic inverters having similar geographical locations and a same output capacity from the photovoltaic inverters in each of the groupings and
   selecting a photovoltaic inverter from the photovoltaic inverters obtained by screening to be the sample machine, and taking the photovoltaic inverters other than the sample machine in the grouping as the power limited inverters.

18. The primary frequency modulation control method according to claim 11, wherein allocating the total active increment value according to the operating state of each of the photovoltaic inverters to be frequency-modulated to obtain the output power target value of each of the photovoltaic inverters to be frequency-modulated comprises:
   calculating, according to the total active power increment value at the grid connection point and an acquired active power value of each of the photovoltaic inverters to be frequency-modulated, an active power adjustable value at the grid connection point, and the active power adjustable value at the grid connection point comprises an active power increasable value at the grid connection point or an active power reducible value at the grid connection point;
   calculating, based on the total active power increment value at the grid connection point and the active power adjustable value at the grid connection point, an active power adjustment ratio of each of the photovoltaic inverters to be frequency-modulated, and the active power adjustment ratio of each of the photovoltaic inverters comprises an increasable power adjustment ratio or a reducible power adjustment ratio; and
   calculating, based on the active power adjustment ratio and the active power value of each of the photovoltaic inverters to be frequency-modulated, an output power target value of each of the photovoltaic inverters to be frequency-modulated.

19. The primary frequency modulation control method according to claim 18, wherein calculating, according to the total active power increment value at the grid connection point and the acquired active power value of each of the photovoltaic inverters to be frequency-modulated, the active power adjustable value at the grid connection point comprises:
   taking; in a case that the total active power increment value at the grid connection point is greater than zero and greater than a preset maximum increasable power limit, a difference between an active power value of the sample machine corresponding to each of the photovoltaic inverters to be frequency-modulated and an active power value of a present photovoltaic inverter to be frequency-modulated as an increasable power value of the photovoltaic inverter to be frequency-modulated, and taking a sum of increasable power values of the photovoltaic inverters to be frequency-modulated as an active power increasable value at the grid connection point; and
   taking, in a case that the total active power increment value at the grid connection point is smaller than zero and smaller than a preset maximum reducible power limit, a difference between the active power value of each of the photovoltaic inverters to be frequency-modulated and the active power lower threshold at the grid connection point as a reducible power value of each of the photovoltaic inverters to be frequency-modulated, and taking a sum of reducible power values of the photovoltaic inverters to be frequency-modulated as an active power reducible value at the grid connection point.

* * * * *